(12) United States Patent
Ishii et al.

(10) Patent No.: US 11,841,606 B2
(45) Date of Patent: Dec. 12, 2023

(54) ACCESSORY SHOE APPARATUS, ELECTRONIC APPARATUS, SHOE APPARATUS AND ACCESSORY APPARATUS

(71) Applicant: CANON KABUSHIKI KAISHA, Tokyo (JP)

(72) Inventors: Kenji Ishii, Kanagawa (JP); Natsumi Sekiguchi, Kanagawa (JP); Yoshinobu Okano, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

(21) Appl. No.: 17/349,274

(22) Filed: Jun. 16, 2021

(65) Prior Publication Data

US 2021/0405513 A1   Dec. 30, 2021

(30) Foreign Application Priority Data

Jun. 25, 2020 (JP) ................... 2020-109357

(51) Int. Cl.
  *G03B 17/56* (2021.01)
  *H01R 13/627* (2006.01)
  *H01R 13/66* (2006.01)
  *H01R 33/94* (2006.01)

(52) U.S. Cl.
  CPC ....... *G03B 17/566* (2013.01); *H01R 13/6271* (2013.01); *H01R 13/6691* (2013.01); *H01R 33/94* (2013.01)

(58) Field of Classification Search
  CPC .. G03B 17/566; G03B 15/05; G03B 2206/00; G03B 2215/056; G03B 2217/002; H01R 13/6271; H01R 13/6691; H01R 33/94
  See application file for complete search history.

(56) References Cited

U.S. PATENT DOCUMENTS

| | | | | |
|---|---|---|---|---|
| 7,668,448 | B2* | 2/2010 | Hayashi | H04N 23/56 |
| | | | | 396/62 |
| 10,567,627 | B2* | 2/2020 | Sakai | H04N 23/66 |
| 2008/0260371 | A1* | 10/2008 | Hughes | G03B 15/05 |
| | | | | 396/155 |
| 2018/0210324 | A1* | 7/2018 | Harden | F16B 1/00 |

FOREIGN PATENT DOCUMENTS

| | | |
|---|---|---|
| JP | 2014-197811 A | 10/2014 |
| JP | 2018-084681 A | 5/2018 |

* cited by examiner

*Primary Examiner* — Travis S Chambers
(74) *Attorney, Agent, or Firm* — Canon U.S.A., Inc. I.P. Division

(57) ABSTRACT

An accessory shoe apparatus on an electronic apparatus includes an engagement member and a communication. A shoe apparatus on an accessory apparatus is detachably attachable to the accessory shoe apparatus. The engagement member engages with the shoe apparatus and including an opening portion that faces the engaged shoe apparatus. The communication element performs wireless communication with the shoe apparatus via an inside of the opening portion.

13 Claims, 19 Drawing Sheets

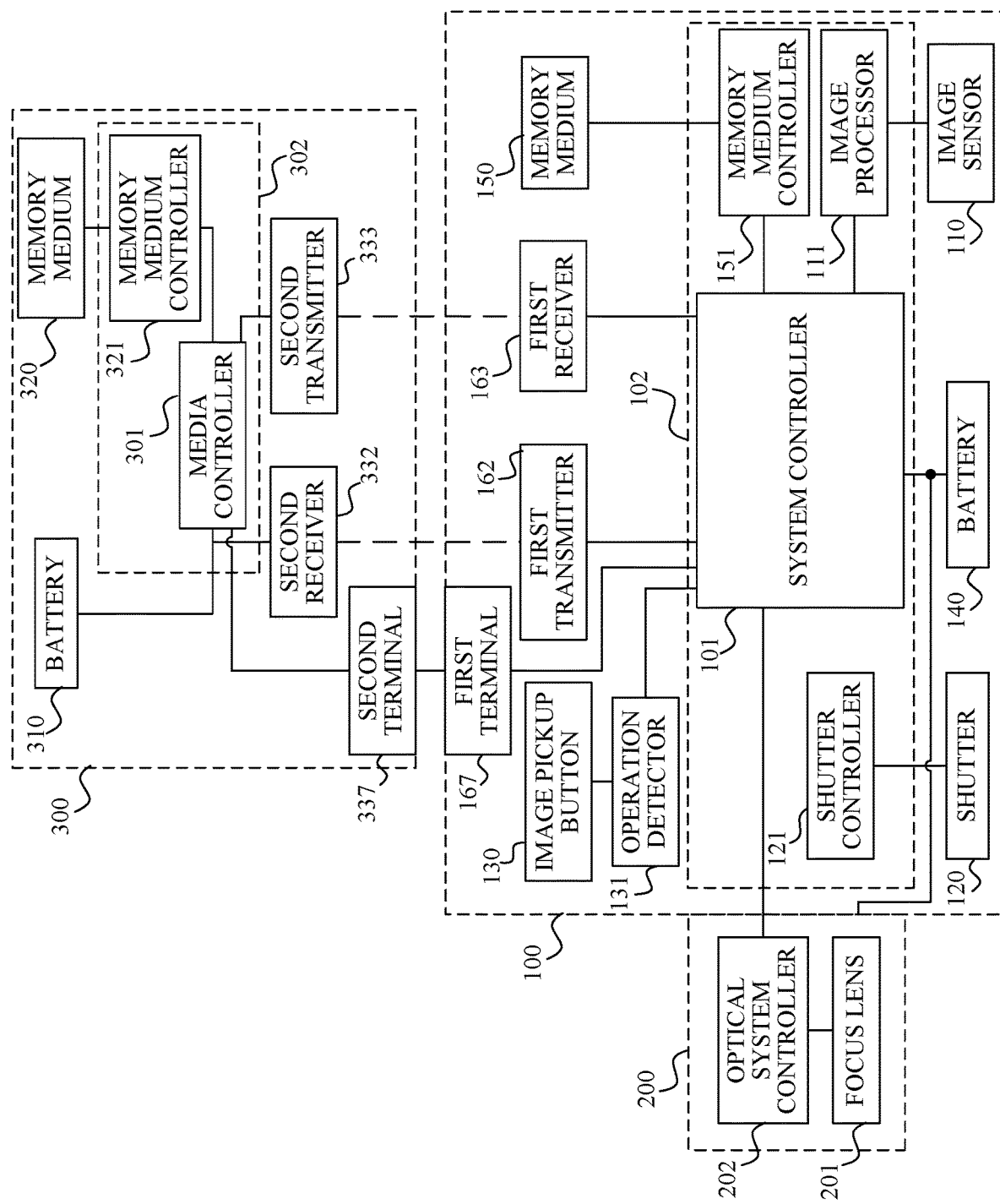

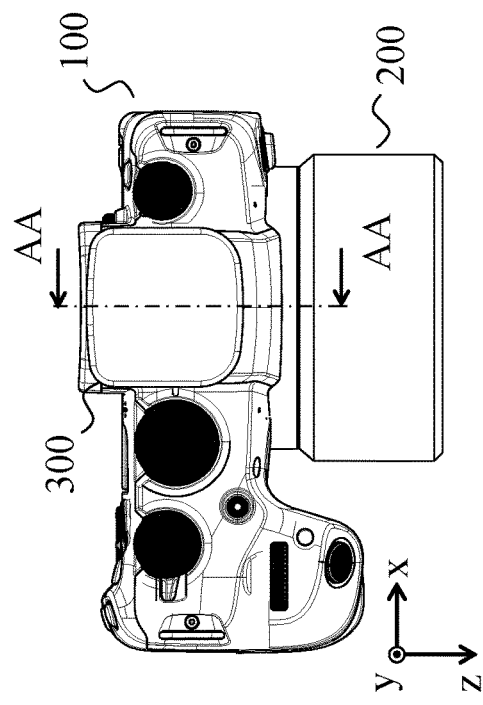
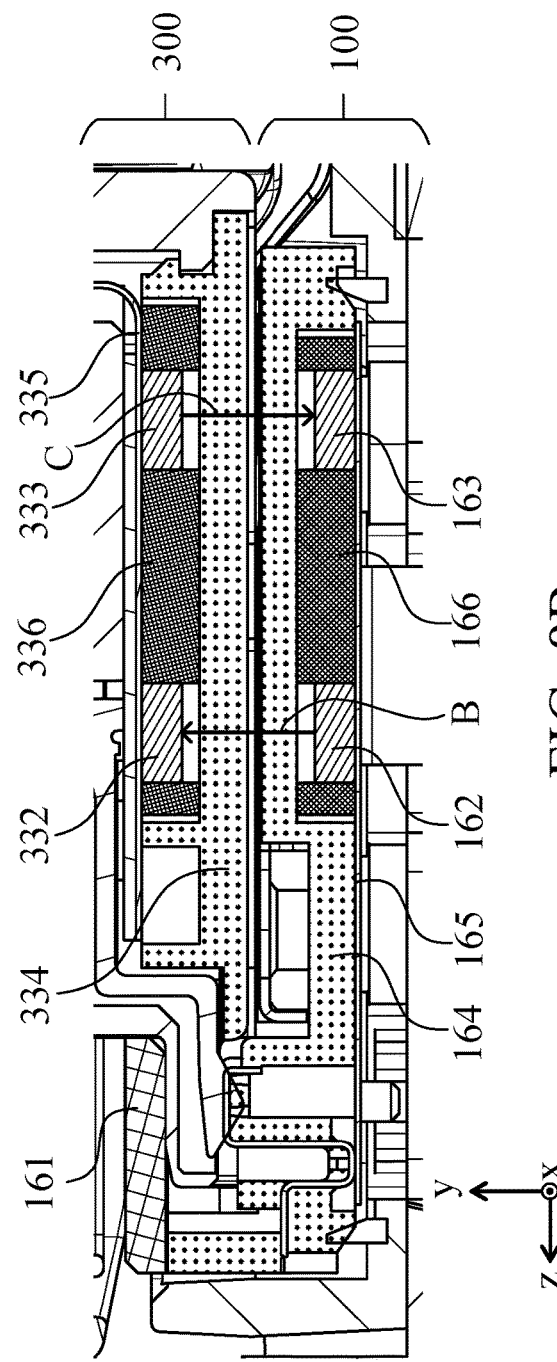
FIG. 8A
FIG. 8B

ACCESSORY SHOE APPARATUS, ELECTRONIC APPARATUS, SHOE APPARATUS AND ACCESSORY APPARATUS

BACKGROUND

Field

The present disclosure relates to an accessory shoe apparatus on an electronic apparatus such as an image pickup apparatus, and a shoe apparatus on an accessory apparatus for the electronic apparatus.

Description of the Related Art

There is an image pickup apparatus, such as a digital camera, including an accessory shoe apparatus that enables detachment/attachment of an accessory apparatus for capturing an image such as an illumination apparatus (or a flash). The accessory shoe apparatus includes a plurality of connection terminals that enable bidirectional communication between the image pickup apparatus and the accessory apparatus. Japanese Patent Application Laid-Open No. ("JP") 2018-084681 discloses an image pickup apparatus in which a viewfinder as an accessory apparatus is detachably attachable to an accessory shoe apparatus having a plurality of connection terminals.

However, if the accessory shoe apparatus includes only a finite number of connection terminals, a communication speed and a communication capacity between the image pickup apparatus and the accessory apparatus may be limited, and functions of the accessory apparatus may not be fully used.

SUMMARY

The present disclosure provides an accessory shoe apparatus and a shoe apparatus each of which can reduce limitations on communication between an accessory apparatus and an electronic apparatus.

According to an aspect of the present disclosure, an accessory shoe apparatus on an electronic apparatus where a shoe apparatus on an accessory apparatus is detachably attachable to the accessory shoe apparatus and includes an engagement member configured to engage with the shoe apparatus and including an opening portion that faces the engaged shoe apparatus, and a communication element configured to perform wireless communication with the shoe apparatus via an inside of the opening portion.

Further features of the present disclosure will become apparent from the following description of exemplary embodiments with reference to the attached drawings.

BRIEF DESCRIPTION OF THE DRAWINGS

FIG. 4 is a block diagram illustrating a configuration of the camera to which an external medium apparatus is attached, according to the first embodiment.

FIGS. 8A and 8B are a top view and a sectional view each illustrating the camera to which an external medium apparatus is attached, according to the first embodiment.

DESCRIPTION OF THE EMBODIMENTS

Referring now to the accompanying drawings, a description will be given of embodiments according to the present disclosure.

First Embodiment

Figure 1:
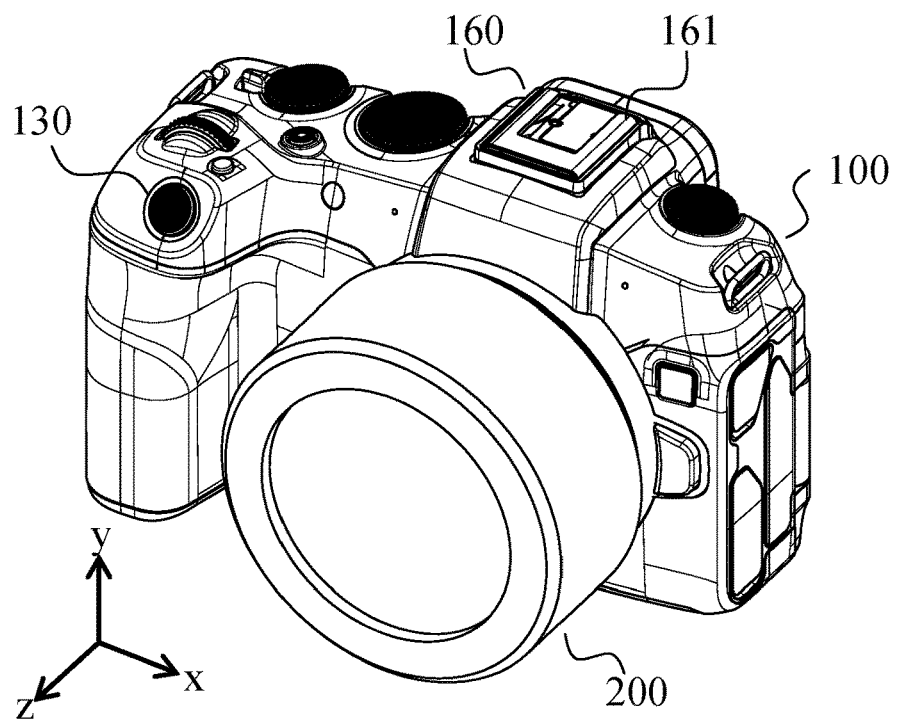
FIG. 1 is a perspective view illustrating an appearance of an image pickup apparatus (camera) including an accessory shoe apparatus according to a first embodiment.
Figure 2:
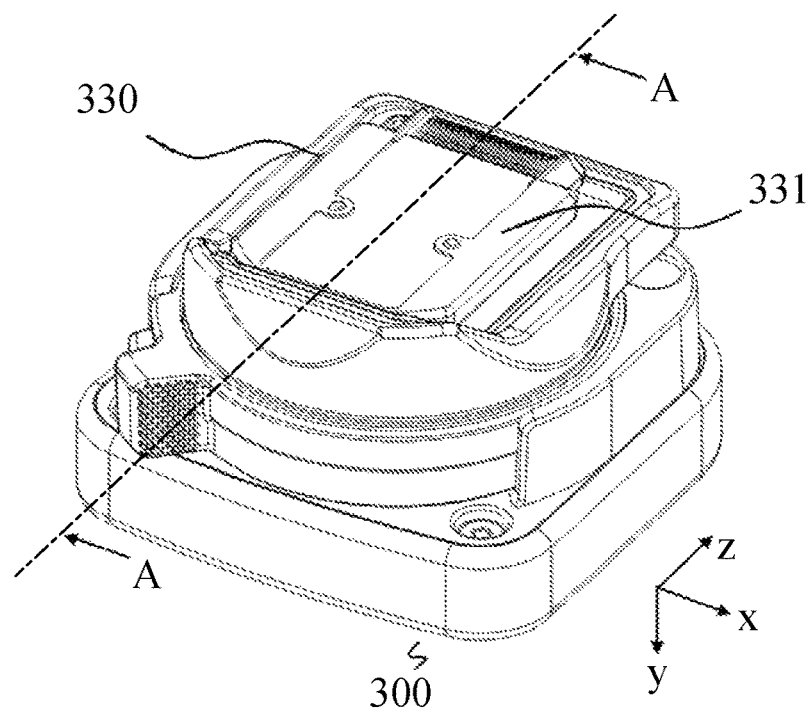
FIG. 2 is an external perspective view illustrating an external medium apparatus according to the first embodiment.

FIG. 1 illustrates an appearance of an image pickup apparatus (hereinafter referred to as a "camera") 100 as an electronic apparatus including an accessory shoe apparatus 160 according to an embodiment of the present disclosure. An image pickup lens 200 as an interchangeable lens is attached to the camera 100. The camera 100 and the image pickup lens 200 are electrically connected via a mount contact group (not illustrated). The camera 100 includes an image pickup button 130 to be operated by a user to instruct to capture an image. An external medium apparatus 300 as an accessory apparatus illustrated in FIG. 2 is detachably attachable to the accessory shoe apparatus 160. The accessory shoe apparatus 160 includes an accessory shoe engagement member 161 configured to engage with and to hold the external medium apparatus 300.

In FIG. 1 and the other drawings, an object side of an optical axis direction is referred to as a +z direction, and an upward direction is referred to as a +y direction. A right side in a view from the object side is referred to as a +x direction. The +z direction corresponds to a first direction, and the ±x direction (hereinafter, also simply referred to as an "x direction") corresponds to a second direction that is orthogonal to the first direction. The second direction may not be a direction orthogonal to the first direction, as long as the second direction intersects the first direction.

The accessory apparatus according to an embodiment of the present disclosure is not limited to the external medium apparatus, but includes various accessories such as an illumination apparatus, a wireless communication apparatus, an electronic viewfinder unit, a microphone, a conversion adapter, various measuring instruments, and a sub camera. The electronic apparatus is not limited to the image pickup apparatus such as a single-lens reflex camera and a video camera, but also includes various electronic apparatuses which are not the image pickup apparatuses.

FIG. 2 illustrates an appearance of the external medium apparatus 300 as obliquely viewed from the lower side. The external medium apparatus 300 includes a shoe apparatus 330 that can detachably attachable to the accessory shoe apparatus 160 on the camera 100. The shoe apparatus 330 includes a shoe attachment foot 331 as a foot member. When the shoe attachment foot 331 engages with the accessory shoe engagement member 161 on the accessory shoe apparatus 160, the external medium apparatus 300 is attached to the camera 100.

Figure 3A:
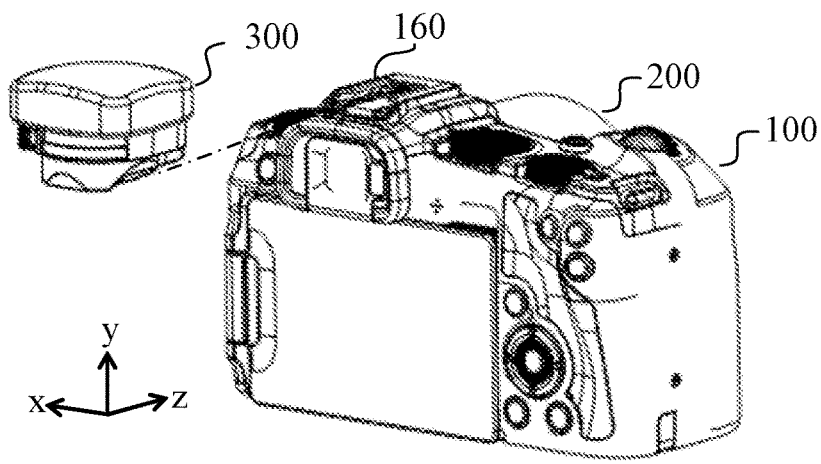
FIGS. 3A to 3C are perspective views each illustrating a method of attaching the external medium apparatus to the camera according to the first embodiment.
Figure 3B:
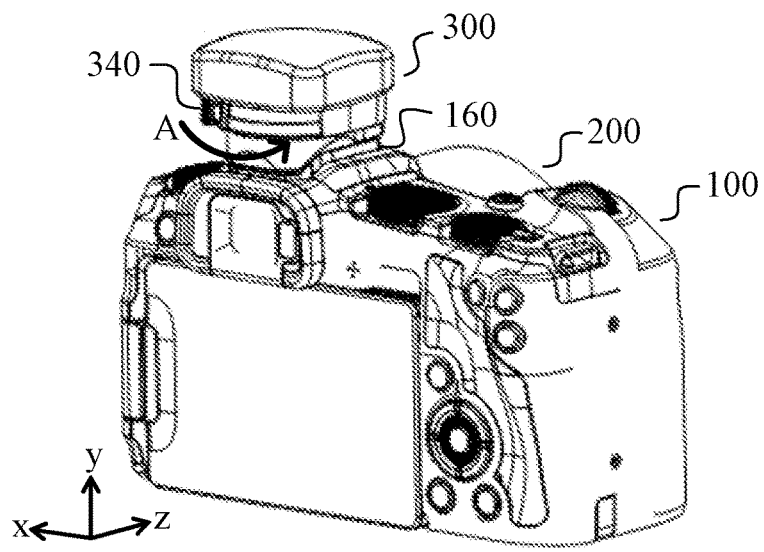
Figure 3C:
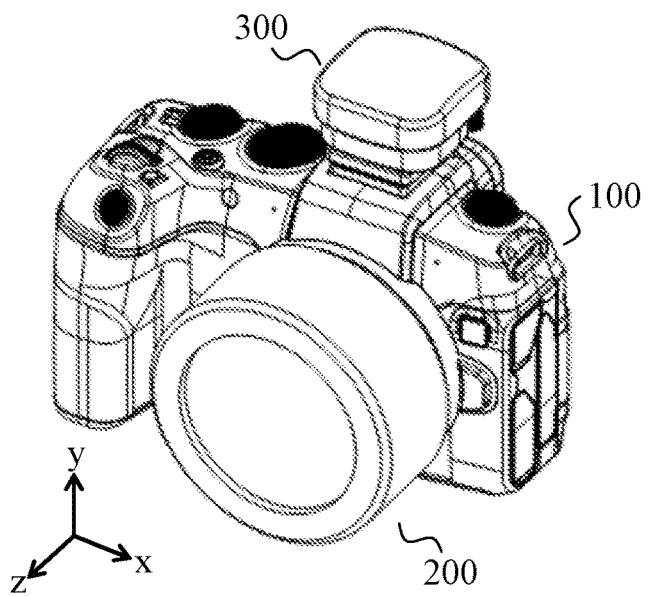

FIGS. 3A and 3B illustrates a method of attaching the external medium apparatus 300 to the camera 100. First, as illustrated in FIG. 3A, by parallelly sliding the external medium apparatus 300 in the +z direction with respect to the camera 100, the shoe attachment foot 331 of the shoe apparatus 330 on the external medium apparatus 300 is engaged with the accessory shoe engagement member 161 of the accessory shoe apparatus 160 on the camera 100. Thereafter, as illustrated in FIG. 3B, a lock lever 340 on the external medium apparatus 300 is rotated in a direction of an arrow A so that the shoe apparatus 330 is locked and is hindered from falling off the accessory shoe apparatus 160 in the −z direction. Thereby, as illustrated in FIG. 3C, the external medium apparatus 300 is attached to the camera 100.

FIG. 4 illustrates an electrical configuration of the camera 100 to which the external medium apparatus 300 is attached. The camera 100 includes a system controller 101. The system controller 101 is configured to control operations of the entire camera 100, to perform various processing, and to output instructions to each part described later. A main substrate 102 includes the system controller 101 and an image processor 111, a shutter controller 121, and a memory medium controller 151 each of which will be described later. A battery 140 is configured to supply electric power to each part in the camera 100, and also configured to supply power to the image pickup lens 200 via a battery contact of a mount contact group (not illustrated). The battery 140 is a secondary battery that is detachably attachable to the camera 100 or is built into the camera 100.

The image pickup lens 200 includes an image pickup optical system having a plurality of lenses, such as a focus lens 201 and the like, and a diaphragm (not illustrated). An optical system controller 202 is configured to drive the focus lens 201 and the diaphragm in response to a focus instruction and a diaphragm instruction which are received from the system controller 101 via the mount contact group, so as to adjust a focusing state of the image pickup lens 200 and an amount of light entering the camera 100.

The camera 100 includes a shutter 120 disposed on an optical path from the image pickup lens 200. The shutter 120 is configured to control an exposure time for an image sensor 110. The shutter controller 121 is configured to drive the shutter 120 in response to a shutter instruction which is input from the system controller 101.

An operation detector 131 is configured to detect that the image pickup button 130 has been operated by the user and to notify the system controller 101 of an instruction for capturing an image. In response to receiving the instruction for capturing the image, the system controller 101 is configured to output an image pickup instruction to the image sensor 110 as well as the shutter instruction to the shutter controller 121. The image sensor 110 includes a photoelectric conversion element such as a CCD sensor or a CMOS sensor, and to convert an object image formed by the image pickup lens 200 into an image pickup signal as an electric signal. The image pickup signal output from the image sensor 110 is input to the image processor 111.

The image processor 111 is configured to perform various image processing on the image pickup signal so as to generate image data. The memory medium controller 151 is an interface unit for communication with a memory medium 150 which is connected to the memory medium controller 151. The memory medium 150 is a memory medium such as a semiconductor memory, and is configured to store the image data generated by the image processor 111.

The external medium apparatus 300 includes a media controller 301. The media controller 301 is configured to control all operations on the external medium apparatus 300. A main substrate 302 includes the media controller 301 and a memory medium controller 321. A battery 310 is configured to supply electric power to each part in the external medium apparatus 300. The battery 310 is a secondary battery that is detachably attachable to the external medium apparatus 300 or is built into the external medium apparatus 300.

The memory medium controller 321 is an interface unit for communication with a memory medium 320 such as a semiconductor memory.

The camera 100 includes a first transmitter 162 as a transmission element and a first receiver 163 as a reception element, each of which is a communication element. The external medium apparatus 300 includes a second receiver 332 as a reception element and a second transmitter 333 as a transmission element, each of which is a communication element. The transmitters and the receivers respectively include wireless communication ICs, each of which includes an antenna for wireless communication inside.

Each of the transmitters and receivers may have a configuration in which the wireless communication IC having an antenna for wireless communication inside is modularized, or may have a configuration in which each of the transmitters and receivers is connected to a flexible printed circuit board so that the antenna and the wireless communication IC can be separately arranged. Further, a function of the wireless communication IC may be integrated into the system controller 101 or the media controller 301, and only the antenna may be disposed as each of the transmitters and receivers. The transmitter and the receiver may not be in separate configurations, but may be configured to be included in a transmission/reception unit in which a transmitter and a receiver are integrated. A wireless communication method is not particularly limited and may use radio waves, electromagnetic induction, magnetic field resonance, or the like, but an example using the radio wave method will be described below.

The first transmitter 162 transmits various data such as the image data stored in the memory medium 150 in the camera 100 to the second receiver 332 by the wireless communication, and the second receiver 332 receives the data. The data received by the second receiver 332 is output to the media controller 301 and stored in the memory medium 320 via the memory medium controller 321.

The second transmitter 333 transmits various data such as the image data stored in the memory medium 320 in the external medium apparatus 300 to the first receiver 163 by the wireless communication, and the first receiver 163 receives the data. The data received by the first receiver 163 is output to the system controller 101 and stored in the memory medium 150 via the memory medium controller 151.

In this way, when the data is transmitted and received by the wireless communication between the camera 100 and the external medium apparatus 300, high-speed and large-capacity communication is realized. In this embodiment, the transmitter and the receiver are separated in each of the camera 100 and the external medium apparatus 300, but they may be integrated.

The camera 100 includes a first terminal 167 having a plurality of connection terminals, and the external medium apparatus 300 includes a second terminal 337 having a plurality of terminals which can come into contact with the plurality of connection terminals of the first terminal 167. When the external medium apparatus 300 is attached to the camera 100, the first terminal 167 and the second terminal 337 come into contact with each other, and communication between the camera 100 and the external medium apparatus 300 can be performed. The communication performed via the first terminal 167 and the second terminal 337 includes, for example, communication for determining a type of an accessory apparatus attached to the camera 100, but is not particularly limited and various types of communication are possible.

Figure 5B:
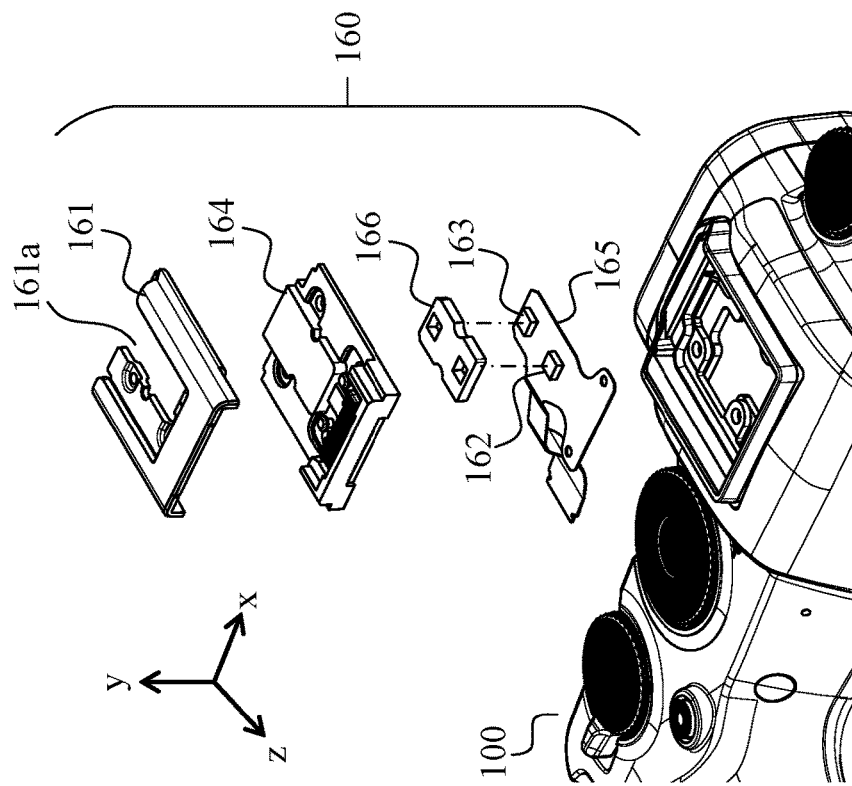
FIG. 5B is an exploded perspective view illustrating the accessory shoe apparatus according to the first embodiment.
Figure 5A:
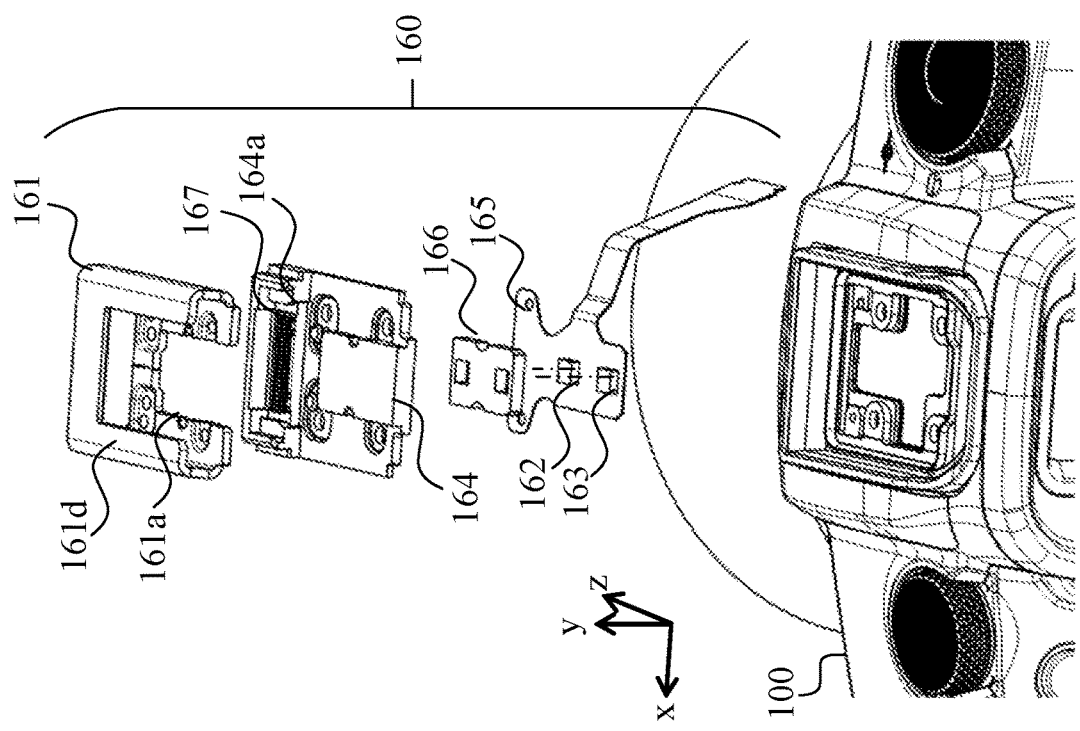
FIG. 5A is an exploded perspective view illustrating the accessory shoe apparatus according to the first embodiment.

FIGS. 5A and 5B are exploded views illustrating the accessory shoe apparatus 160 on the camera 100. A terminal holder 164a is on a first cover member 164 as an exterior member. The terminal holder 164a is insert-molded with, as the first terminal 167, a plurality of connection terminals, each of which is an electric terminal, arranged side by side at equal pitches in the x direction. On the accessory shoe apparatus 160, the first terminal 167 is disposed on the +z side, i.e., a front side of the camera 100, where the +z side is a direction in which the external medium apparatus 300 is attached. In this embodiment, the terminal holder 164a is on the first cover member 164, but the first cover member 164 and the terminal holder 164a as the holder may be separate parts.

On a flexible board 165, the first terminal 167, the first transmitter 162 and the first receiver 163 are disposed. Specifically, the first transmitter 162 and the first receiver 163 are arranged so that they are separated from each other in the z direction on the −z side, that is a back side of the camera 100, i.e., a side opposite to the +z side, of the first terminal 167. The flexible board 165 is electrically connected to the main substrate 102 via a connector (not illustrated).

The first cover member 164 is a member configured to cover the first transmitter 162 and the first receiver 163. The first transmitter 162 and the first receiver 163 are separated in the z direction in a plane covered by the first cover member 164, that is, in the xz plane. The first cover member 164 is made of non-conductive material, such as resin, so that the first cover member 164 does not block the radio waves from the first transmitter 162 and to the first receiver 163.

The accessory shoe engagement member 161 has a square U-shape that opens in the −z direction, and is made of sheet metal so that the accessory shoe engagement member 161 has a strength to engage with and hold the shoe apparatus 330 on the external medium apparatus 300. The accessory shoe engagement member 161 and the first cover member 164 are fixed by thermal caulking or the like. The accessory shoe engagement member 161 includes a pair of engagement portions 161d which are separated from each other in the x direction, respectively extend in the z direction, and are to engage with a pair of foot engagement portions described later of the shoe attachment foot 331 of the shoe apparatus 330. The accessory shoe engagement member 161 further includes, between the pair of engagement portions 161d, an opening portion 161a facing the shoe apparatus 330 engaged with the pair of engagement portions 161d.

In a view from the +y side, which is a side facing the opening portion 161a, i.e., a direction orthogonal to the opening surface, the above-mentioned first transmitter 162 and first receiver 163 are disposed inside the opening portion 161a. Thereby, the first transmitter 162 and the first receiver 163 can wirelessly communicate with the external medium apparatus 300 via the inside of the opening portion 161a. The width between the pair of engagement portions 161d in the x direction is equal to or larger than the width of the opening portion 161a, and the accessory shoe engagement member 161, which is a metal part, is not disposed between each of the first transmitter 162 and the first receiver 163 and the external medium apparatus 300. Therefore, the accessory shoe engagement member 161 does not disrupt the wireless communication between each of the first transmitter 162 and the first receiver 163 and the external medium apparatus 300. The accessory shoe engagement member 161 and the first cover member 164 are fixed to the camera 100 by a screw member (not illustrated).

A first anti-magnetic member 166 that absorbs radio waves of a specific frequency is disposed between the first transmitter 162 and the first receiver 163, and is disposed around each of those. The first anti-magnetic member 166 is to suppress transmission (or propagation) of the radio waves emitted from the first transmitter 162 so as to hinder the first receiver 163 from receiving the radio waves from the first transmitter 162. The first anti-magnetic member 166 may be disposed at least between the first transmitter 162 and the first receiver 163, but it may be more preferable that the first anti-magnetic member 166 surrounds the first transmitter 162 and the first receiver 163 as illustrated in the drawing. The first anti-magnetic member 166 in this embodiment absorbs radio waves of a specific frequency, but the material is not particularly limited as long as the first anti-magnetic member 166 is a member that suppresses the transmission of radio waves by reflecting radio waves or the like, and for example, silicon rubber or the like may be used. The first anti-magnetic member 166 may not be included if the configuration is such that wireless communication is performed by a communication method having high directivity unlike radio waves.

The accessory shoe apparatus 160 configured as described above is fixed to the camera 100 with screws (not illustrated).

Figure 6:
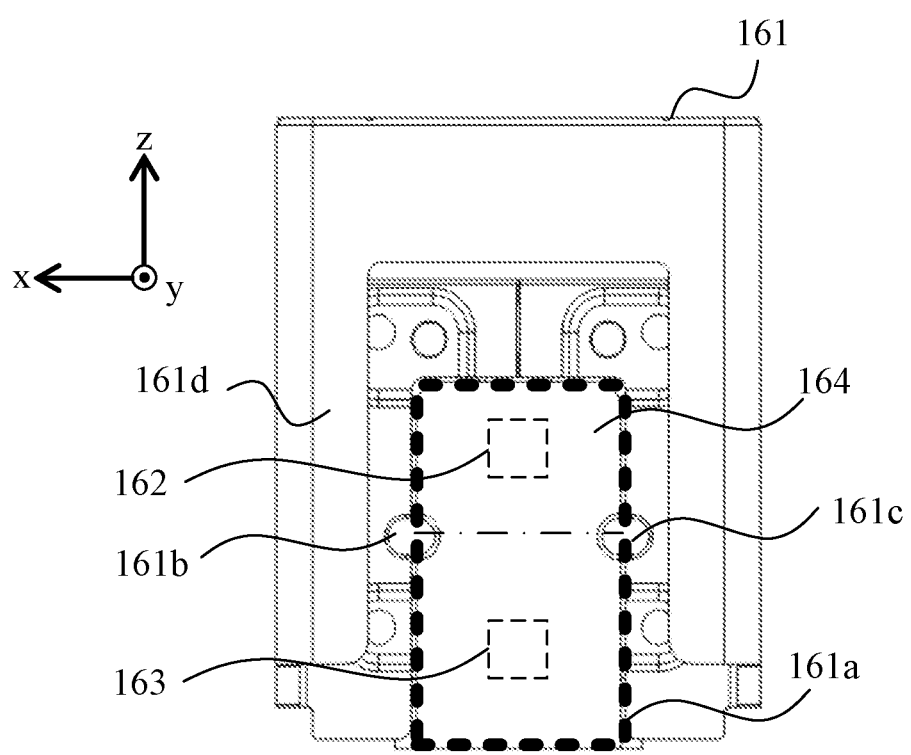
FIG. 6 is a top view illustrating the accessory shoe apparatus according to the first embodiment.

FIG. 6 illustrates the accessory shoe apparatus 160 in a view from the upper side (+y side), that is, the side facing the opening portion 161a. The accessory shoe engagement member 161 includes a pair of lock pin engagement portions 161b and 161c as lock engagement portions that engages with lock pins, which are 338a and 338b in FIG. 7 described later, of the shoe apparatus 330 on the external medium apparatus 300. The lock pin engagement portions 161b and 161c are separately arranged on different sides of the opening portion 161a in the x direction, and the first transmitter 162 and the first receiver 163 are disposed between the pair of lock pin engagement portions 161b and 161c in the x direction. More specifically, the first transmitter 162 and the first receiver 163 are respectively disposed on different sides in the z direction of a straight line (one-dot chain line) extending in the x direction connecting the pair of lock pin engagement portions 161b and 161c, and are respectively located at positions separated from the straight line in the z direction.

With such an arrangement, the first transmitter 162 and the first receiver 163 can be arranged away from the lock pins which are metal members so that the wireless communication is not disrupted by the lock pins.

Figure 7:
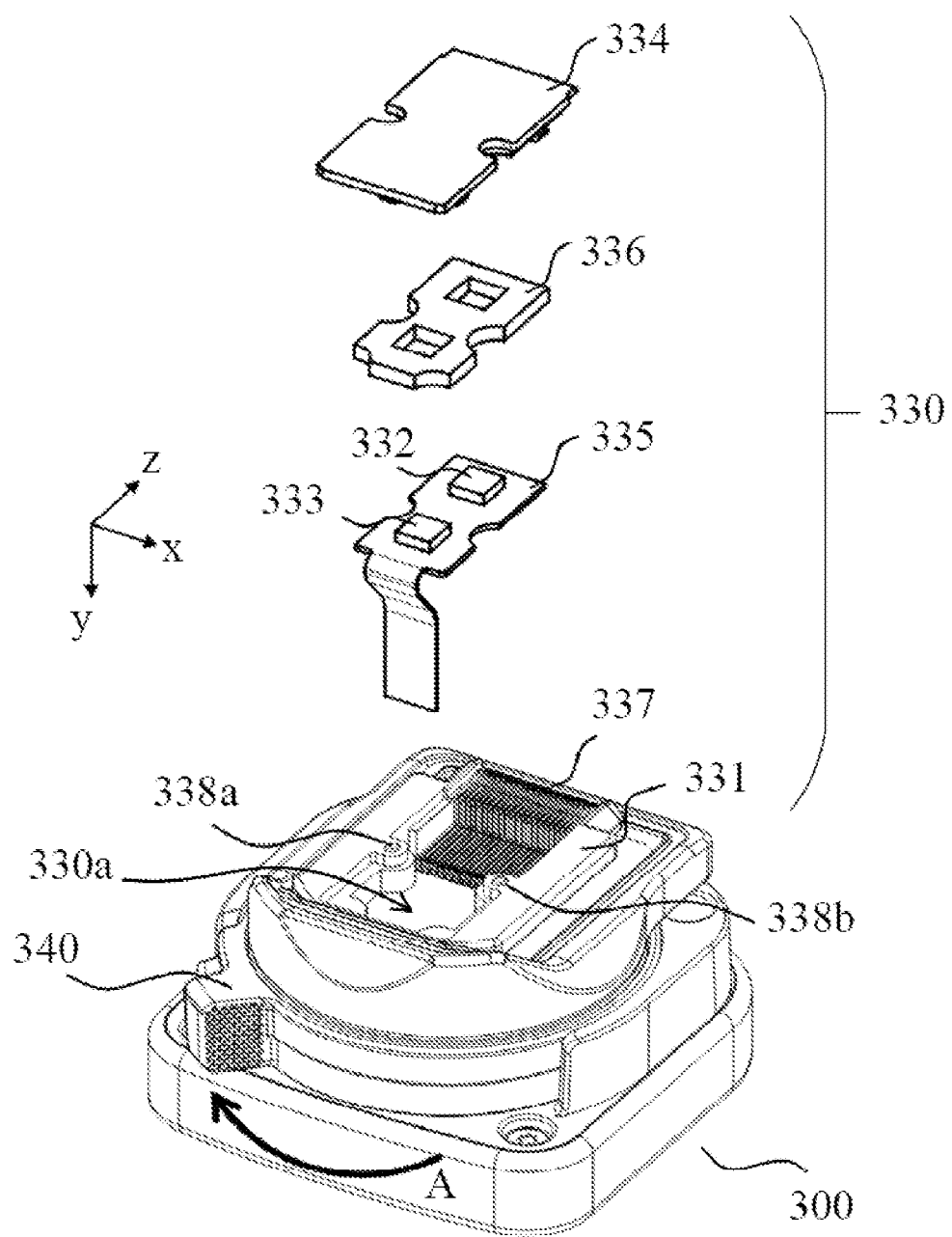
FIG. 7 is an exploded perspective view illustrating a shoe apparatus on the external medium apparatus according to the first embodiment.

FIG. 7 is an exploded view illustrating the shoe apparatus 330 of the external medium apparatus 300. The shoe attachment foot 331 includes the pair of foot engagement portions where the foot engagement portions are separated from each other in the x direction and respectively extend in the z direction. The pair of foot engagement portions engages with the pair of engagement portions of the accessory shoe engagement member 161. A concave portion 330a that opens in the direction facing the accessory shoe apparatus 160 is disposed on an area of the shoe attachment foot 331, the area being located between the pair of foot engagement portions and facing the accessory shoe apparatus 160 engaged with the pair of foot engagement portions.

In an end on the +z side of the shoe attachment foot 331, as a second terminal 337, a plurality of connection terminals (electric terminal) are arranged side by side at equal pitches in the x direction. The second terminal 337 comes into contact with the first terminal 167 of the camera 100 and thereby communication can be performed between the external medium apparatus 300 and the camera 100.

The shoe apparatus 330 further includes lock pins 338a and 338b as lock members made of metal. As illustrated in FIG. 7, when the user rotates the lock lever 340 in the direction of an arrow A, the lock pins 338a and 338b project from the shoe apparatus 330 in the −y direction, and engage with the lock pin engagement portions 161b and 161c of the accessory shoe apparatus 160. This hinders the shoe apparatus 330 attached to the accessory shoe apparatus 160 from falling off the accessory shoe apparatus 160. FIG. 7 illustrates the state after the rotation operation.

The second receiver 332 and the second transmitter 333 are on a flexible board 335. The flexible board 335 is inserted inside from an insertion portion (not illustrated) and electrically connected to a main substrate 302 via a connector (not illustrated). The second receiver 332 and the second transmitter 333 on the flexible board 335 are disposed inside the concave portion 330a on the −z side, which is opposite to the +z side, of the second terminal 337 in the shoe attachment foot 331.

The second receiver 332 and the second transmitter 333 are disposed between the pair of lock pins 338a and 338b arranged separately in the x direction, between which the concave portion 330a is disposed. More specifically, the second receiver 332 and the second transmitter 333 are respectively arranged on different side in the z direction of a straight line extending in the x direction connecting the pair of lock pins 338a and 338b, and are respectively located at positions separated from the straight line in the z direction.

The second cover member 334 as an exterior member is a member that covers the second receiver 332, the second transmitter 333, and a second anti-magnetic member 336 described later. The second receiver 332 and the second transmitter 333 are separated in the z direction in a plane covered by the second cover member 334, i.e., in the xz plane. The second cover member 334 is made of non-conductive material, such as resin, so that the radio waves to the second receiver 332 and from the second transmitter 333 are not blocked by the second cover member 334.

The second anti-magnetic member 336 that absorbs radio waves of a specific frequency is disposed between the second receiver 332 and the second transmitter 333 and is disposed around each of those. The second anti-magnetic member 336 is to suppress the transmission (or propagation) of radio waves emitted from the second transmitter 333 so that the second receiver 332 does not receive the radio waves from the second transmitter 333. The second anti-magnetic member 336 may be disposed at least between the second receiver 332 and the second transmitter 333, but it may be more preferable that the second anti-magnetic member 336 surrounds the second receiver 332 and the second transmitter 333 as illustrated in the drawing. The second anti-magnetic member 336 in this embodiment absorbs radio waves of a specific frequency, but the material is not particularly limited as long as the second anti-magnetic member 336 is a member that suppresses the transmission of radio waves by reflecting the radio waves, and for example, silicon rubber or the like may be used.

FIG. 8A illustrates a camera 100 to which the external medium apparatus 300 is attached in a view from the upper side, and FIG. 8B illustrates a cross section of an AA-AA line in FIG. 8A. In FIG. 8B, the first transmitter 162 and the second receiver 332 are arranged at positions facing each other, and the first receiver 163 and the second transmitter 333 are arranged at positions facing each other. As indicated by an arrow B, the radio waves emitted from the first transmitter 162 pass through the first cover member 164 and the second cover member 334 and are received by the second receiver 332. As indicated by an arrow C, the radio waves emitted from the second transmitter 333 pass through the second cover member 334 and the first cover member 164 and are received by the first receiver 163. With such an arrangement in which a transmitter and a receiver are arranged at positions facing each other, wireless communication can be performed at the shortest distance, and deterioration of communication can be made smaller as compared with an arrangement in which the transmitter and the receiver are arranged at positions not facing each other.

If the first transmitter 162 and the second transmitter 333 are close to each other and the radio waves emitted from the first transmitter 162 and the radio waves emitted from the second transmitter 333 interfere with each other, the first receiver 163 and the second receiver 332 receive wrong radio waves, respectively.

Therefore, in this embodiment, the first transmitter 162 and the first receiver 163 facing the second transmitter 333 are arranged at positions separated from each other in the z direction, which is a longitudinal direction of the accessory shoe apparatus 160, so that a long distance is secured between the first transmitter 162 and the second transmitter 333. Thereby, the interference between the radio waves emitted from the first transmitter 162 and the radio waves emitted from the second transmitter 333 can be reduced, and good wireless communication can be ensured.

Next, a detailed description will be given of the configuration of the shoe apparatus 330 on the external medium apparatus 300 with reference to FIG. 9.

Figure 9:
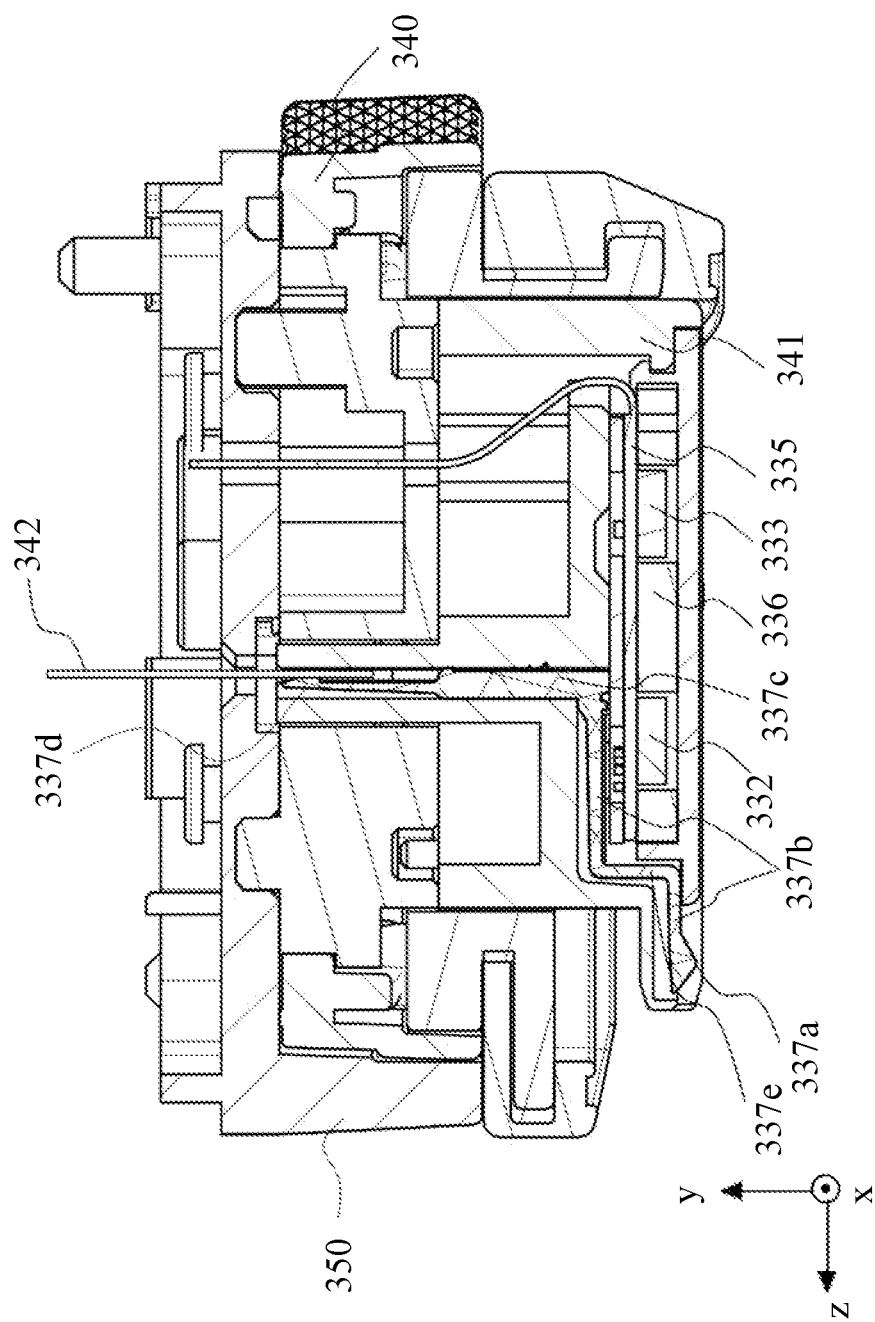
FIG. 9 is a sectional view illustrating the shoe apparatus on the external medium apparatus according to the first embodiment.

FIG. 9 illustrates a cross section of the shoe apparatus 330 for the AA line indicated in FIG. 2. In FIG. 9, the members relating to the shoe apparatus 330 will be described with reference numerals, but the description of the other members will be omitted.

The shoe apparatus 330 includes an enclosure 341, the lock lever 340, a holder 343, the second terminal 337, the second receiver 332, the second transmitter 333, the flexible board 335, the second cover member 334 and the second anti-magnetic member 336.

The enclosure 341 is formed integrally with the shoe attachment foot 331 and is disposed between the pair of engagement portions 161*d* when the shoe apparatus 330 is attached to the accessory shoe apparatus 160. The enclosure 341 is made of non-conductive material, such as resin. The holder 343 holds the lock pins 338*a* and 338*b* movably in the y direction, the lock pins 338*a* and 338*b* being members for hindering the external medium apparatus 300 from falling off the camera 100 after the shoe apparatus 330 is attached to the accessory shoe apparatus 160.

When the lock lever 340 is rotated, the holder 343 moves in the −y direction by action of cam mechanisms on the lock lever 340 and on the holder 343. At that time, the lock pins 338*a* and 338*b* also move in the −y direction together with the holder 343. Thereby, the lock pins 338*a* and 338*b* engage with the lock pin engagement portions 161*b*, 161*c* of the accessory shoe apparatus 160.

The second terminal 337 includes a tip portion 337*a* that comes into contact with the corresponding first terminal 167. The second terminal 337 includes an extension portion 337*b* having a shape extending from the tip portion 337*a* in the −z direction, i.e., a direction opposite to the first direction, and making the tip portion 337*a* shift in the +y direction by elastic deformation when the tip portion 337*a* comes into contact with the first terminal 167. At the end of the extension portion 337*b* in the −z direction, an orthogonal extension portion 337*c* is formed, the orthogonal extension portion 337*c* extending so as to be substantially orthogonal to the extension portion 337*b*. The tip of the orthogonal extension portion 337*c* includes a flexible board connection 337*d* for connecting to the flexible board 342 electrically connected to the media controller 301.

A step portion 337*e* is formed on the substantially central portion of the extension portion 337*b*, and a step is formed on the step portion 337*e* in the y direction. By this step being formed, the second receiver 332, the second transmitter 333, and the flexible board 335 can be disposed so that they are not located on the −y direction side of the tip portion 337*a*, i.e., the side closer to the accessory shoe apparatus 160 engaged with the shoe attachment foot 331 than the tip portion 337*a*. Further, by the step being formed, at least one of the second receiver 332 or the second transmitter 333 is lined up with at least part of the connection terminals of the second terminal 337 including a portion not exposed to the outside, in the y direction, which is a direction facing the accessory shoe apparatus 160, and thereby it is possible to reduce the size in the z direction.

In this embodiment, since the step portion 337*e* is formed on the substantially central portion of the extension portion 337*b*, in the extension portion 337*b*, the position of the end on the orthogonal extension portion 337*c* side, which is opposite to the tip portion 337*a* side, is different from the position of the end on the tip portion 337*a* side, and is shifted to the y side, which is the side facing the accessory shoe apparatus 160. However, the configuration may not include the step portion 337*e*. For example, the extension portion 337*b* may be inclined in the z direction, and the end on the orthogonal extension portion 337*c* side may be shifted to the y side with respect to the end on the tip portion 337*a* side without the step portion 337*e* being formed.

Since the extension portion 337*b* has the difference between the position of the end on the tip portion 337*a* side and the position of the end on the orthogonal extension portion 337*c* side, a space is generated between the second terminal 337 and a surface facing the accessory shoe apparatus 160. When at least part of the second receiver 332 and second transmitter 333 is disposed on the space, it is possible to reduce the size of the shoe apparatus 330.

The second receiver 332 and the second transmitter 333 are on the flexible board 335, and the flexible board 335 is electrically connected to the media controller 301.

As described above, the accessory shoe engagement member 161 is made of strong sheet metal, but both the accessory shoe engagement member 161 is not located between the first transmitter 162 and the second receiver 332 and between the first receiver 163 and the second transmitter 333. Therefore, it is possible to hinder wireless communication from being disrupted by the accessory shoe engagement member 161.

The second anti-magnetic member 336 is fixed in a state of being press-fitted into the concave portion 330*a* by the second cover member 334. Hence, it is possible to reduce a gap between the second anti-magnetic member 336 and the second cover member 334, and to reduce leakage of radio waves between the second anti-magnetic member 336 and the second cover member 334.

According to the above description, wireless communication is possible between the electronic apparatus and the accessory apparatus, and the members for strengthening the attachment state of the electronic apparatus and the accessory apparatus do not interfere with the wireless communication. Thereby, it is possible to reduce the limitations on communication between the electronic apparatus and the accessory apparatus.

Second Embodiment

Next, a description will be given of a second embodiment of the present disclosure. In this embodiment, components common to the first embodiment are designated by the same reference numerals as those of the first embodiment, and a detailed description thereof will be omitted.

Figure 20:
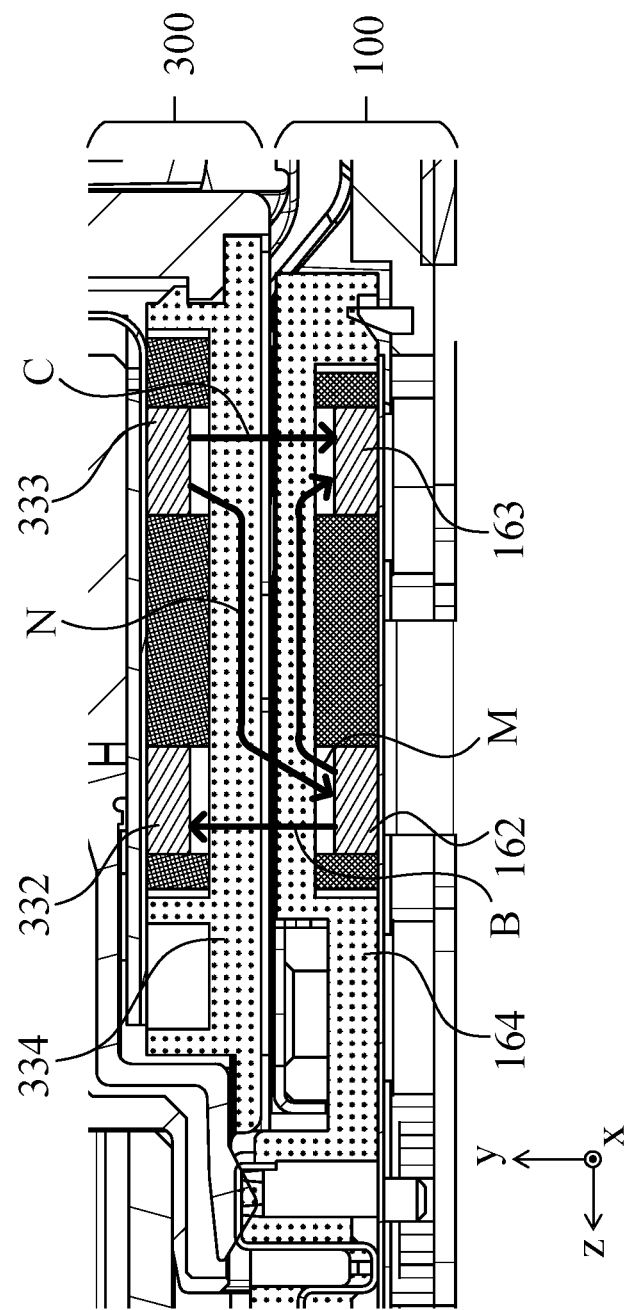
FIG. 20 is a sectional view illustrating an issue to be addressed by the second embodiment.

First, an issue to be addressed by this embodiment will be described with reference to FIG. 20. FIG. 20 illustrates the same cross section as FIG. 8B. As in previous description given with reference to FIG. 8B, the radio waves emitted from the first transmitter 162 is received by the second receiver 332 (arrow B), and the radio waves emitted from the second transmitter 333 is received by the first receiver 163 (arrow C). However, the radio waves propagate inside the first cover member 164 and the second cover member 334, and therefore the radio waves emitted from the first transmitter 162 may be received by the first receiver 163 as indicated by an arrow M. That is, the first receiver 163 may erroneously detect the radio waves. Further, as indicated by an arrow N, the radio waves emitted from the second transmitter 333 may interfere with the radio waves emitted from the first transmitter 162 and may be received by the second receiver 332. That is, the second receiver 332 may erroneously detect the radio waves.

This embodiment is to suppress the erroneous detection of radio waves by the first receiver 163 and the second receiver 332 when the second receiver 332 and the second transmitter 333 face the first transmitter 162 and the first receiver 163, respectively.

Although JP 2014-197811 discloses a method for hindering radio wave interference in a substrate or a housing each of which is below the transmission/reception unit, radio wave interference cannot be hindered inside a housing on a side above the transmission/reception unit. That is, the method in JP 2014-197811 cannot solve the erroneous detection of the radio waves described with reference to FIG. 20.

Figure 10A:
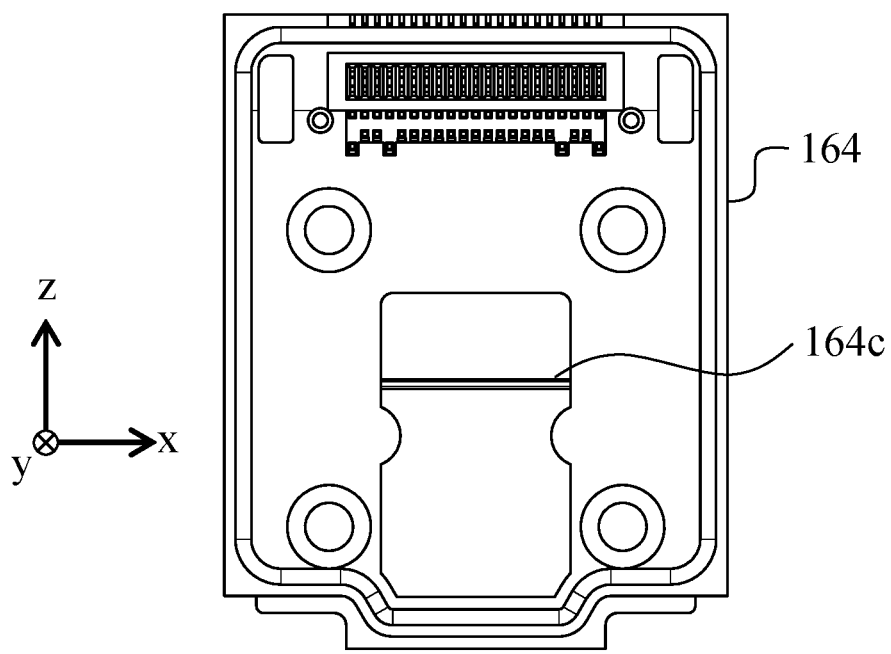
FIGS. 10A and 10B are bottom views each illustrating an accessory shoe apparatus according to a second embodiment.
Figure 10B:
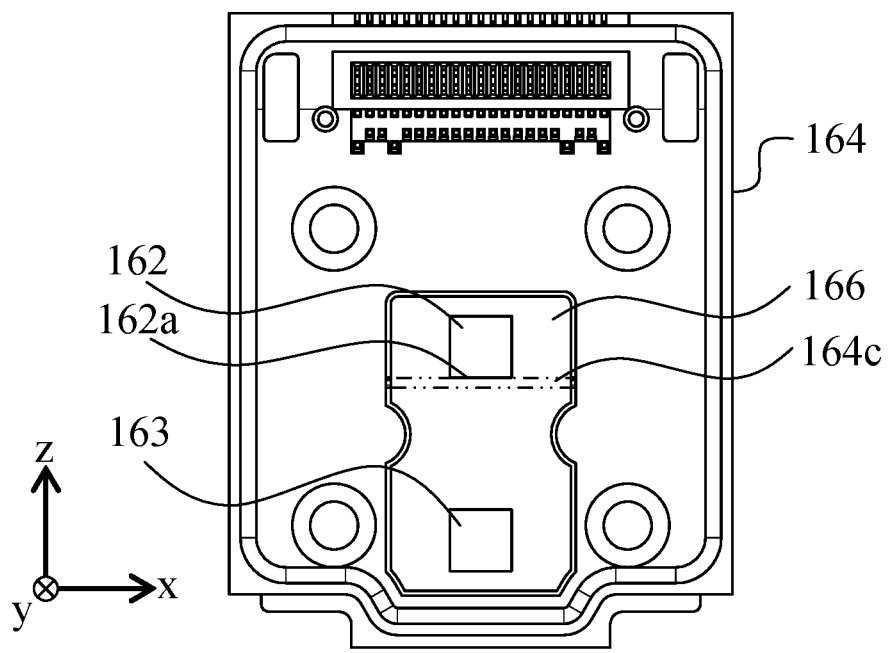

FIGS. 10A and 10B illustrate an accessory shoe apparatus 160 in this embodiment. FIG. 10A illustrates a first cover member 164 as viewed from the lower side, that is, the −y side. FIG. 10B illustrates a first transmitter 162, a first receiver 163, a first anti-magnetic member 166, and a first cover member 164, as viewed from the lower side. The x and z directions are directions in a plane covered by the first cover member 164.

As illustrated in FIG. 10A, the first cover member 164 includes a first groove 164c extending in the x direction as a second direction. In a view from the lower side, as indicated by two-dot chain lines in FIG. 10B, the first groove 164c is located at a position next to a first edge (end) 162a on the first receiver 163 side of the first transmitter 162 in the z direction, that is, disposed on a position along an end on a reception element side of the first transmitter 162. The first cover member 164 has the first groove 164c in an area that covers the first anti-magnetic member 166, that is, an area that overlaps the first anti-magnetic member 166. As a result, on the first cover member 164, the first groove 164c divides the area that overlaps the first anti-magnetic member 166 into an area including the first transmitter 162 and an area including the first receiver 163. A description will be given later of the reason why the first groove 164c is formed.

Figure 11A:
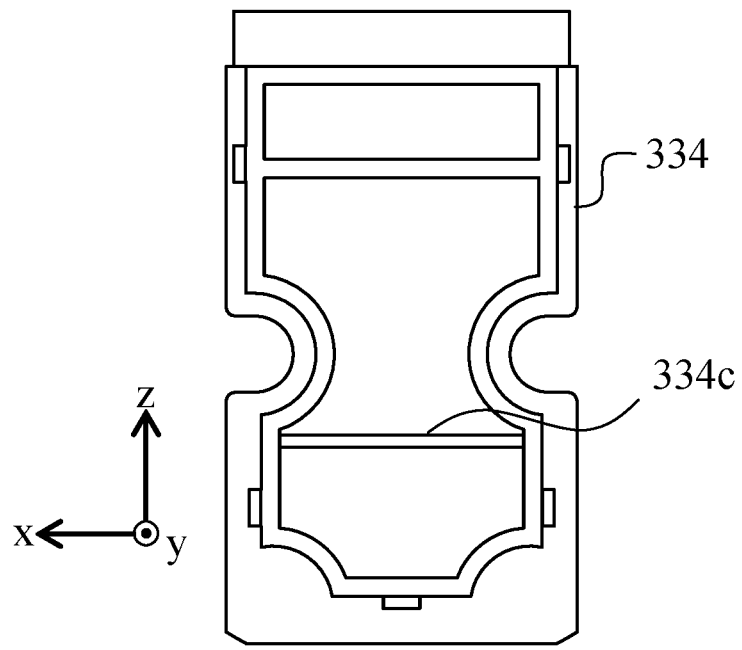
FIGS. 11A and 11B are top views each illustrating a shoe apparatus on an external medium apparatus according to the second embodiment.
Figure 11B:
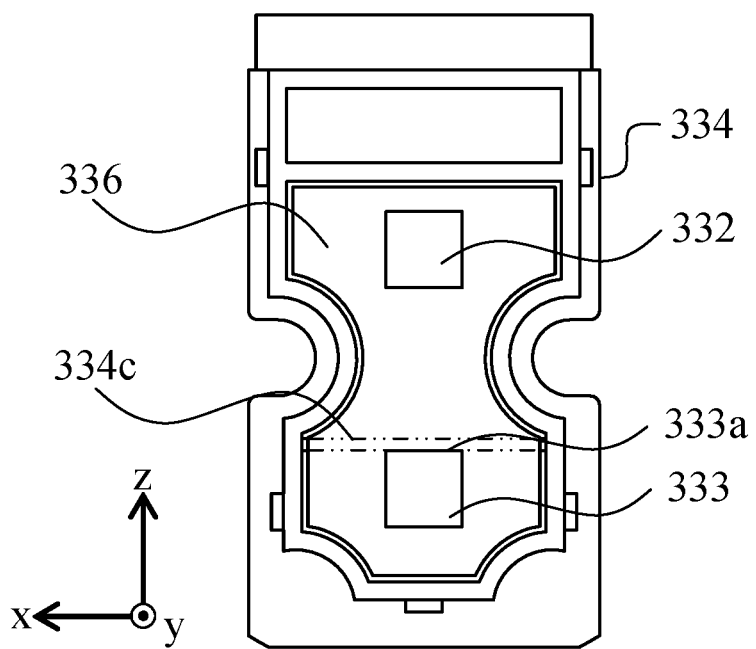

FIGS. 11A and 11B illustrate a shoe apparatus 330 in this embodiment. FIG. 11A illustrates a second cover member 334 as viewed from the upper side, that is, the +y side. FIG. 11B illustrates the second receiver 332, the second transmitter 333, a second anti-magnetic member 336, and the second cover member 334 as viewed from the upper side. The x and z directions are directions in a plane covered by the second cover member 334.

As illustrated in FIG. 11A, the second cover member 334 includes a second groove 334c extending in the x direction. In a view from the upper side, as indicated by two-dot chain lines in FIG. 11B, the second groove 334c is located at a position next to a first edge (end) 333a on the second receiver 332 side of the second transmitter 333 in the z direction, that is, disposed on a position along an end on a reception element side of the second transmitter 333. The second cover member 334 has the second groove 334c in an area that covers the second anti-magnetic member 336, that is, an area that overlaps the second anti-magnetic member 336. As a result, on the second cover member 334, the second groove 334c divides the area that overlaps the second anti-magnetic member 336 into an area including the second transmitter 333 and an area including the second receiver 332.

Figure 12A:
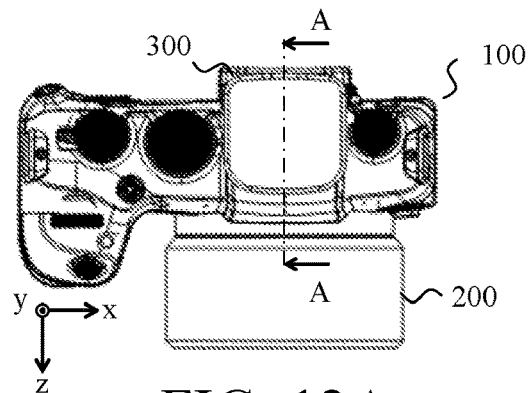
FIGS. 12A to 12C are a top view, a sectional view, and a partial enlarged view each illustrating a camera to which the external medium apparatus is attached, according to the second embodiment.
Figure 12B:
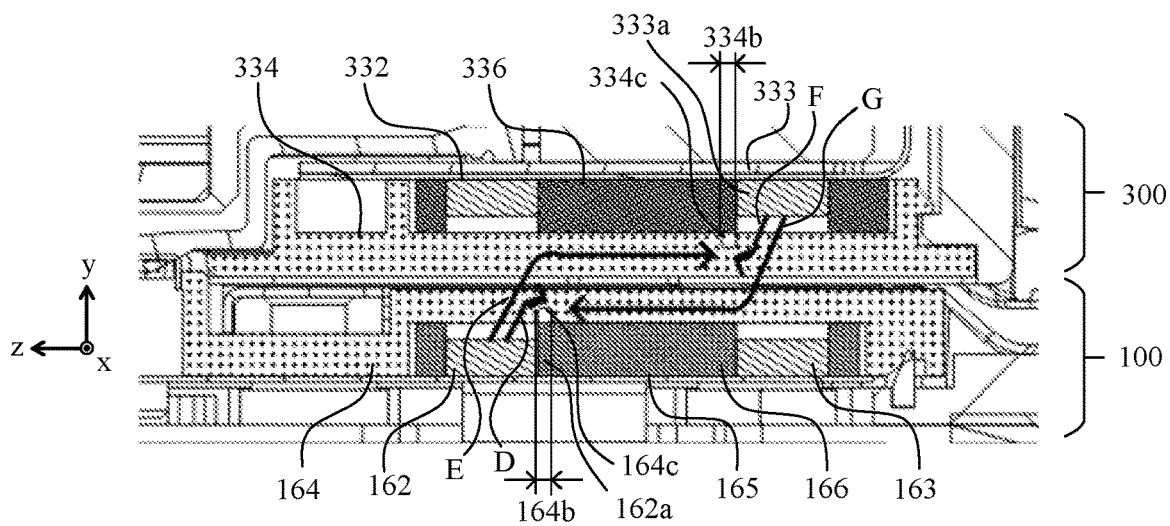
Figure 12C:
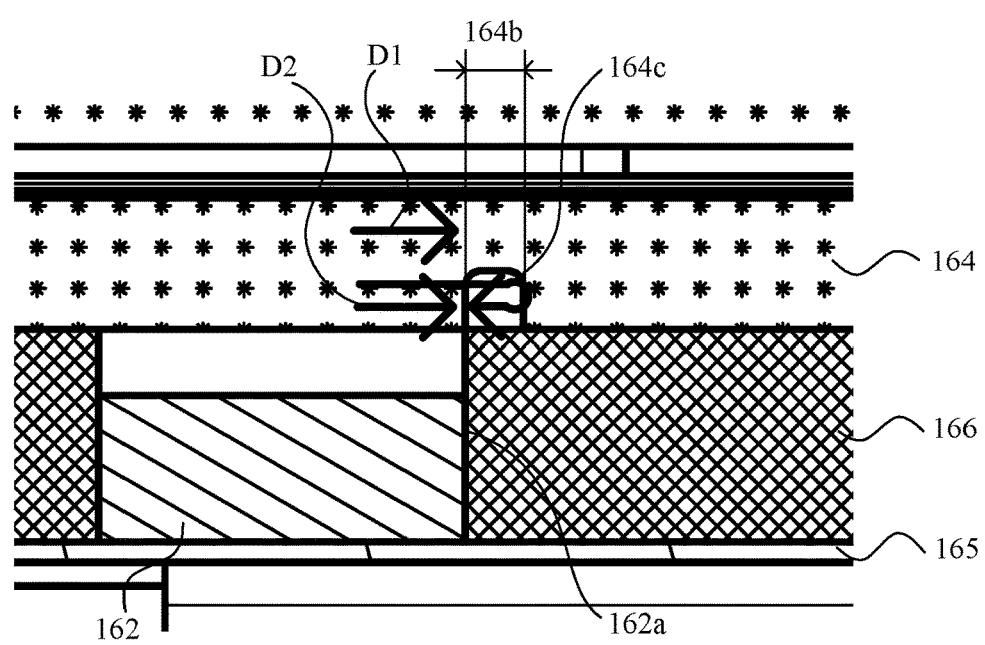

Next, a description will be given of the reason why the first groove 164c and the second groove 334c are formed. FIG. 12A illustrates the camera 100 to which the external medium apparatus 300 is attached, in a view from the upper side, and FIG. 12B illustrates a cross section for a line A-A in FIG. 12A. FIG. 12C is an enlarged view illustrating part around the first groove 164c.

In FIG. 12B, radio waves D emitted from the first transmitter 162 propagates in the first cover member 164. As illustrated in FIG. 12C, a thickness in the y direction of a portion of the first cover member 164 in which the first groove 164c is formed is thinner than the other portions, and a resistance value in this thinned portion is increased. As the resistance value increases, radio waves D1 that passes through this portion of the radio waves D is attenuated and hardly propagates to the first receiver 163. That is, the propagation of the radio waves D1 is hindered.

Further, among the radio waves D, radio waves D2 entering the first groove 164c is reflected inside the first groove 164c. Here, when a width 164b of the first groove 164c is ¼ of a wavelength of the radio waves D2, phase of the entering wave of the radio waves D2 and phase of the reflected wave in the first groove 164c are shifted by ½ wavelength. When wavelengths whose phases are shifted by ½ wavelength are combined, they cancel each other, and thus further propagation of the radio waves D2 can be hindered by the first groove 164c.

Instead of reducing the entire thickness of the first cover member 164, this embodiment limits the portion in which the thickness of the first cover member 164 is reduced, by providing the first groove 164c. Thereby, the overall strength of the first cover member 164 does not decrease, and a good moldability of the first cover member 164 can be ensured.

Radio waves E emitted from the first transmitter 162 pass through the first cover member 164 and propagate in the second cover member 334, but further propagation is hindered by the second groove 334c as in the radio waves D. A width 334b of the second groove 334c may be ¼ of the wavelength of the radio waves E. Radio waves F emitted from the second transmitter 333 propagate in the second cover member 334, but further propagation is similarly hindered by the second groove 334c. The radio waves E emitted from the second transmitter 333 pass through the second cover member 334 and propagate in the first cover member 164, but the further propagation is similarly hindered by the first groove 164c.

In order that the first groove 164c hinders the propagation of the radio waves in this way, at least part of the width 164b of the first groove 164c needs to overlap the first anti-magnetic member 166 in the y direction. Further, in order to hinder the propagation of the radio waves in the second groove 334c, at least part of the width 334b of the second groove 334c needs to overlap the second anti-magnetic member 336 in the y direction.

Here, the second groove 334c is formed at a position closer to the second transmitter 333 than the first groove 164c in the z direction. The reason thereof will be described with reference to FIG. 13.

Figure 13:
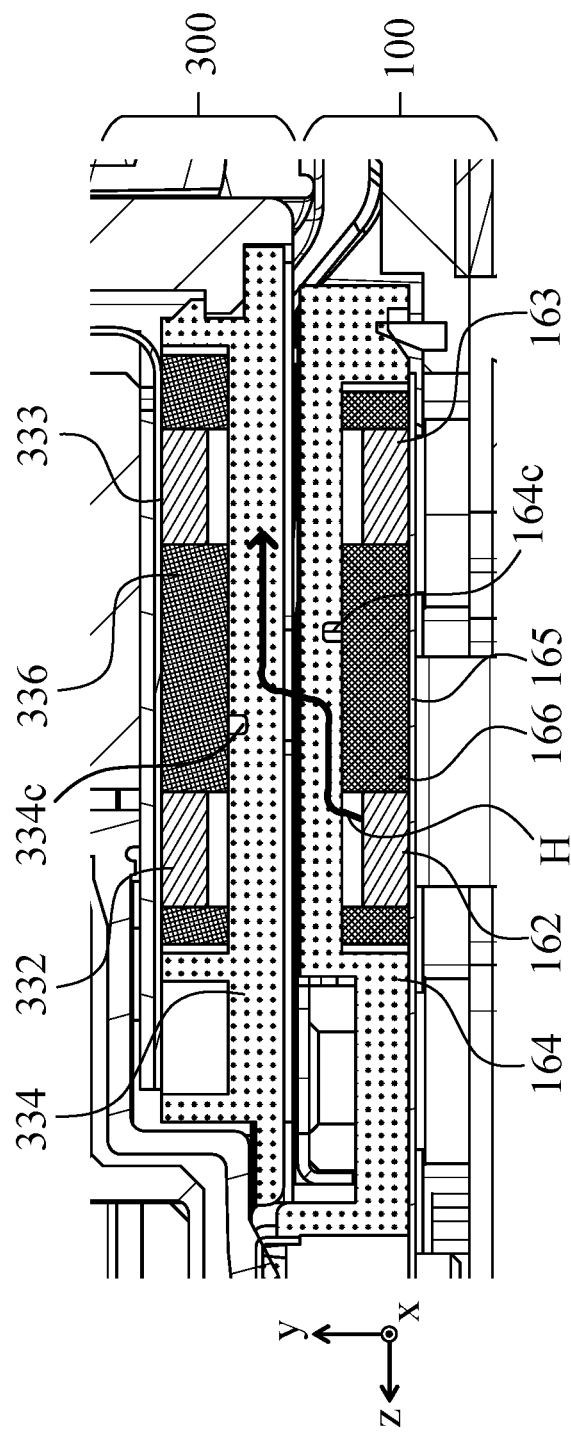
FIG. 13 is a sectional view illustrating a comparative example according to the second embodiment.

FIG. 13 illustrates a case where the second groove 334c is formed at a position closer to the second receiver 332 than the first groove 164c in the z direction. In this case, radio waves H emitted from the first transmitter 162 propagate in the first cover member 164 toward the first groove 164c, and then may enter the second cover member 334 at a position closer to the second transmitter 333 than the second groove 334c. Thereafter, the radio waves H may propagate and may reach the second transmitter 333. In order that such propagation is hindered, the second groove 334c needs to be formed at a position closer to the second transmitter 333 than the first groove 164c.

As described above, the first groove 164c is located at a position next to the first edge 162a of the first transmitter 162 in the z direction, and the second groove 334c is located at a position next to the first edge 333a of the second transmitter 333. Thereby, it is possible to reduce a risk of erroneous detection caused the by reflection and diffusion of radio waves in the first cover member 164 and the second cover member 334.

This embodiment has described a case where the first groove 164c is located at a position next to the first transmitter 162 in the area overlapping the first anti-magnetic member 166 of the first cover member 164, and the second groove 334c is located at a position next to the second transmitter 333 in the area overlapping the second anti-magnetic member 336 of the second cover member 334. However, it is not always necessary to form each groove at a position next to each transmitter, as long as each groove is formed at a position closer to each transmitter than each receiver in the z direction. This also applies to the other embodiments described later.

When the first transmitter 162 and the second transmitter 333 emit radio waves of a plurality of types of frequencies (or wavelengths), each cover member may have a plurality of grooves having groove widths which are different depending on the wavelengths. The same also applies to the other embodiments described later.

Third Embodiment

Next, a description will be given of a third embodiment of the present disclosure. In this embodiment, components common to the first and second embodiments are designated by the same reference numerals as those of those embodiments and a description thereof will be omitted.

Figure 14A:
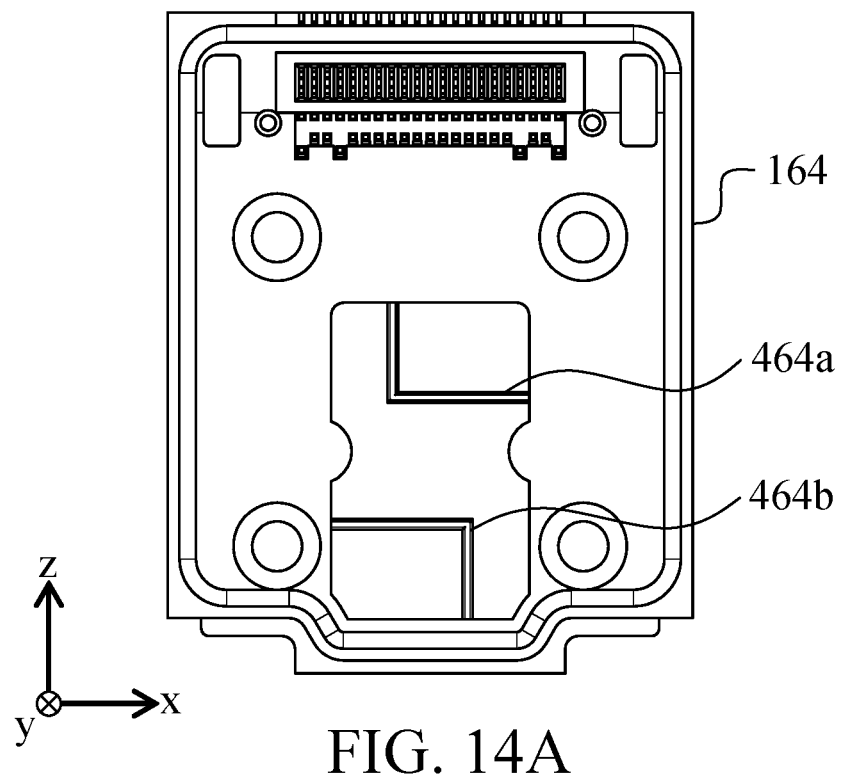
FIGS. 14A and 14B is a diagram illustrating an accessory shoe apparatus according to a third embodiment.
Figure 14B:
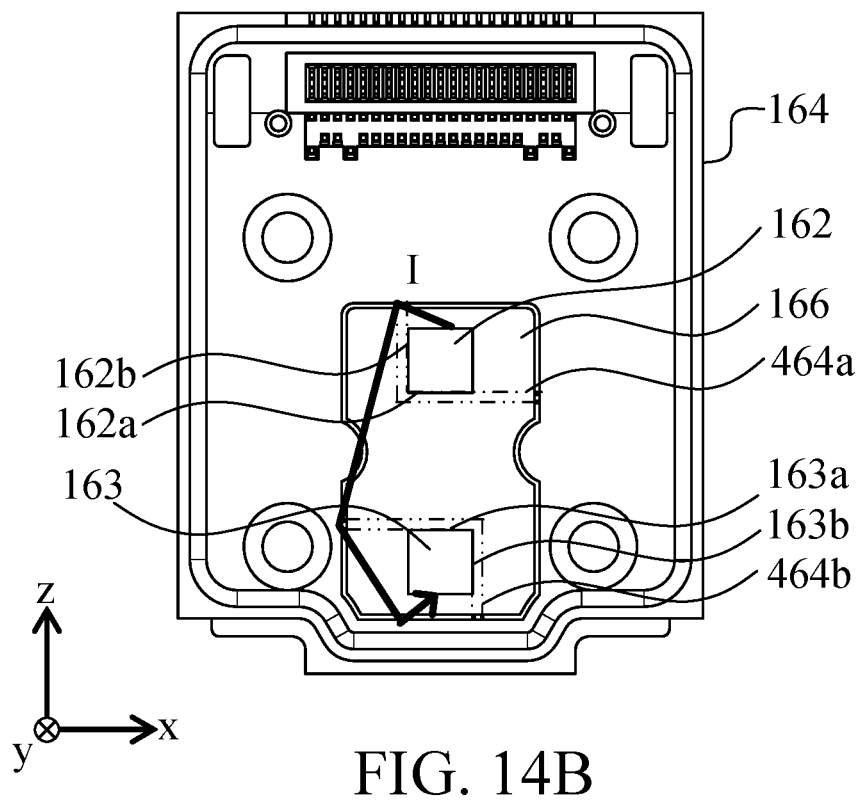

FIGS. 14A and 14B illustrate an accessory shoe apparatus 160 in this embodiment. FIG. 14A illustrates a first cover member 164 as viewed from the lower side, that is, the −y side. FIG. 14B illustrates a first transmitter 162, a first receiver 163, a first anti-magnetic member 166, and a first cover member 164 as viewed from the lower side.

As illustrated in FIG. 14A, the first cover member 164 includes a first groove 464a and a third groove 464b. In a view from the lower side, as indicated by two-dot chain lines in FIG. 14B, the first groove 464a extends in the x direction at a position next to a first edge 162a on the first receiver 163 side of the first transmitter 162, and extends in the z direction at a position next to a second edge 162b which is orthogonal to and next to and different from the first edge 162a. The first cover member 164 includes the first groove 464a in an area overlapping the first anti-magnetic member 166. As a result, on the first cover member 164, the first groove 464a divides the area overlapping the first anti-magnetic member 166 into an area including the first transmitter 162 and the other area.

In a view from the lower side, as indicated by two-dot chain lines in FIG. 14B, the third groove 464b extends in the x direction at a position next to a first edge 163a on the first transmitter 162 side of the first receiver 163, and extends in the z direction at a position next to a second edge 163b which is orthogonal to and next to the first edge 163a. The first cover member 164 includes the third groove 464b in an area overlapping the first anti-magnetic member 166. As a result, on the first cover member 164, the third groove 464b divides the area overlapping the first anti-magnetic member 166 into an area including the first receiver 163 and the other area. That is, on the first cover member 164, the first groove 464a and the third groove 464b divide the area overlapping the first anti-magnetic member 166 into the area including the first transmitter 162, the area including the first receiver 163, and the other area.

When the above-described first groove 464a and third groove 464b are provided, even if the radio waves emitted from the first transmitter 162 is reflected inside the first cover member 164 and the radio waves head toward the first receiver 163 as indicated by an arrow I in FIG. 14B, since a distance to the first receiver 163 is increased, the radio waves can be attenuated and can be hindered from arriving at the first receiver 163.

In this embodiment, the first groove 464a and the third groove 464b are provided, but only the first groove 464a may be provided. Further, the portion of each of the first groove 464a and the third groove 464b extending in the z direction may be extended in a direction oblique to the z direction (a direction which is different from the x direction).

Figure 15A:
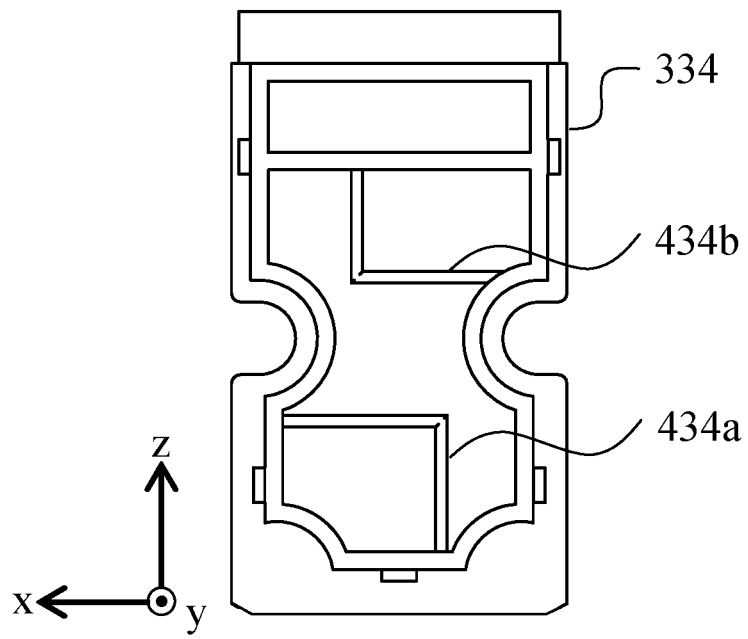
FIGS. 15A and 15B are diagrams each illustrating a shoe apparatus on an external medium apparatus according to the third embodiment.
Figure 15B:
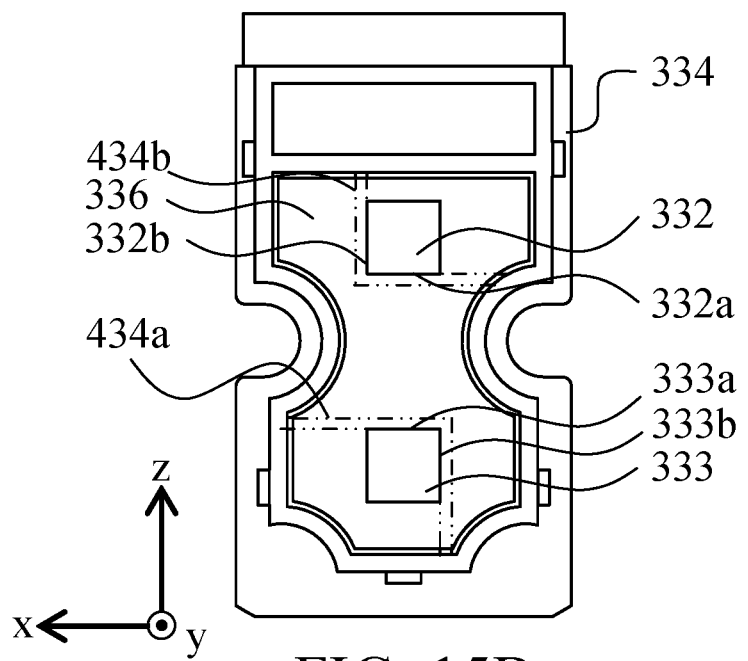

FIGS. 15A and 15B illustrate a shoe apparatus 330 in this embodiment. FIG. 15A illustrates a second cover member 334 as viewed from the upper side, that is, the +y side. FIG. 15B illustrates a second receiver 332, a second transmitter 333, a second anti-magnetic member 336 and a second cover member 334 as viewed from the upper side.

As illustrated in FIG. 15A, the second cover member 334 includes a second groove 434a and a fourth groove 434b. In a view from the upper side, as indicated by the two-dot chains line in FIG. 15B, the second groove 434a extends in the x direction at a position next to a first edge 333a on the second receiver 332 side of the second transmitter 333, and extends in the z direction at a position next to a second edge 333b that is orthogonal to and next to the first edge 333a. The second cover member 334 includes the second groove 434a in an area overlapping the second anti-magnetic member 336. As a result, on the second cover member 334, the second groove 434a divides the area overlapping the second anti-magnetic member 336 into an area including the second transmitter 333 and the other area.

In a view from the upper side, as indicated by the two-dot chain lines in FIG. 15B, the fourth groove 434b extends in the x direction at a position next to a first edge 332a on the second transmitter 333 side of the second receiver 332, and extends in the z direction at a position next to a second edge 332b that is orthogonal to and next to the first edge 332a. The second cover member 334 includes the fourth groove 434b in an area overlapping the second anti-magnetic member 336. As a result, on the second cover member 334, the fourth groove 434b divides the area overlapping the second anti-magnetic member 336 into an area including the second receiver 332 and the other area. That is, on the second cover member 334, the second groove 434a and the fourth groove 434b divides the area overlapping the second anti-magnetic member 336 into the area including the second transmitter 333, the area including the second receiver 332, and the other area.

When the above-described second groove 434a and fourth groove 434b are provided, even if the radio waves emitted from the second transmitter 333 is reflected inside the second cover member 334 in the xz plane and the radio waves head toward the second receiver 332, since a distance to the second receiver 332 is increased, the radio waves can be attenuated and can be hindered from arriving at the second receiver 332.

In this embodiment, the second groove 434a and the fourth groove 434b are provided, but only the second groove 434a may be provided. Further, the portion of each of the second groove 434a and the fourth groove 434b extending in the z direction may be extended in a direction oblique to the z direction (a direction which is different from the x direction).

Fourth Embodiment

Next, a description will be given of a fourth embodiment of the present disclosure. In this embodiment, components common to the first to third embodiments are designated by the same reference numerals as those of those embodiments and a description thereof will be omitted.

Figure 16A:
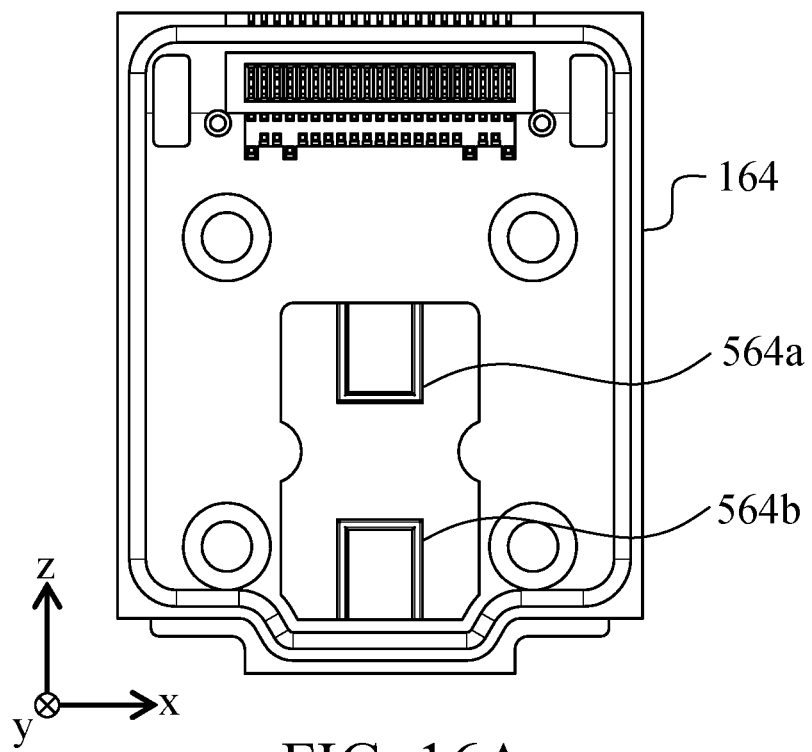
FIGS. 16A and 16B are diagrams each illustrating an accessory shoe apparatus according to a fourth embodiment.
Figure 16B:
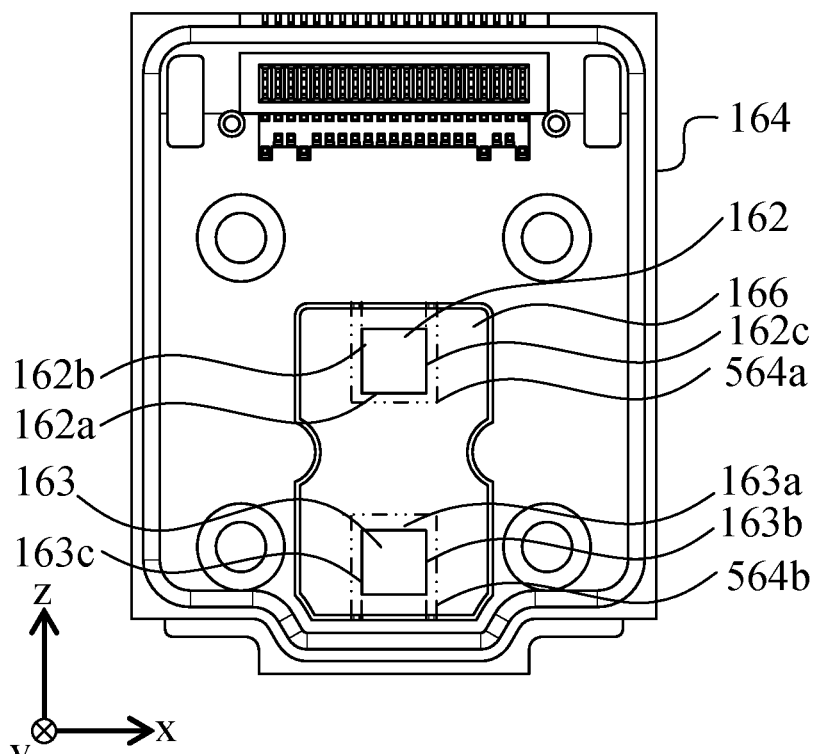

FIGS. 16A and 16B illustrate an accessory shoe apparatus 160 in this embodiment. FIG. 16A illustrates a first cover member 164 as viewed from the lower side, that is, the −y side. FIG. 16B illustrates a first transmitter 162, a first receiver 163, a first anti-magnetic member 166, and a first cover member 164 as viewed from the lower side.

As illustrated in FIG. 16A, the first cover member 164 includes a first groove 564a and a third groove 564b. In a view from the lower side, as indicated by two-dot chain lines in FIG. 16B, the first groove 564a extends in the x direction at a position next to a first edge 162a on the first receiver 163 side of the first transmitter 162, and extends in the z direction at positions next to a second edge 162b and a third edge 162c each of which is orthogonal to and next to the first edge 162a. The first cover member 164 includes the first groove 564a in an area overlapping the first anti-magnetic member 166. As a result, on the first cover member 164, the first groove 564a divides the area overlapping the first anti-magnetic member 166 into an area including the first transmitter 162 and the other area.

In a view from the lower side, as indicated by two-dot chain lines in FIG. 16B, the third groove 564b extends in the x direction at a position next to a first edge 163a on the first transmitter 162 side of the first receiver 163, and extends in the z direction at positions next to a second edge 163b and a third edge 163c, each of which is orthogonal to and next to the first edge 163a. The first cover member 164 includes the third groove 564b in an area overlapping the first anti-magnetic member 166. As a result, on the first cover member 164, the third groove 564b divides the area overlapping the first anti-magnetic member 166 into an area including the first receiver 163 and the other area. That is, on the first cover member 164, the first groove 564a and the third groove 564b divides the area overlapping the first anti-magnetic member 166 into the area including the first transmitter 162, the area including the first receiver 163, and the other area.

When the above-described first groove 564a and third groove 564b are provided, even if the radio waves emitted from the first transmitter 162 is reflected inside the first cover member 164 in the xz plane and the radio waves head toward the first receiver 163, since a distance to the first receiver 163 is increased, the radio waves can be attenuated and can be hindered from arriving at the first receiver 163.

In this embodiment, the first groove 564a and the third groove 564b are provided, but only the first groove 564a may be provided. Further, the portion of each of the first groove 564a and the third groove 564b extending in the z direction may be extended in a direction oblique to the z direction (a direction which is different from the x direction).

Figure 17A:
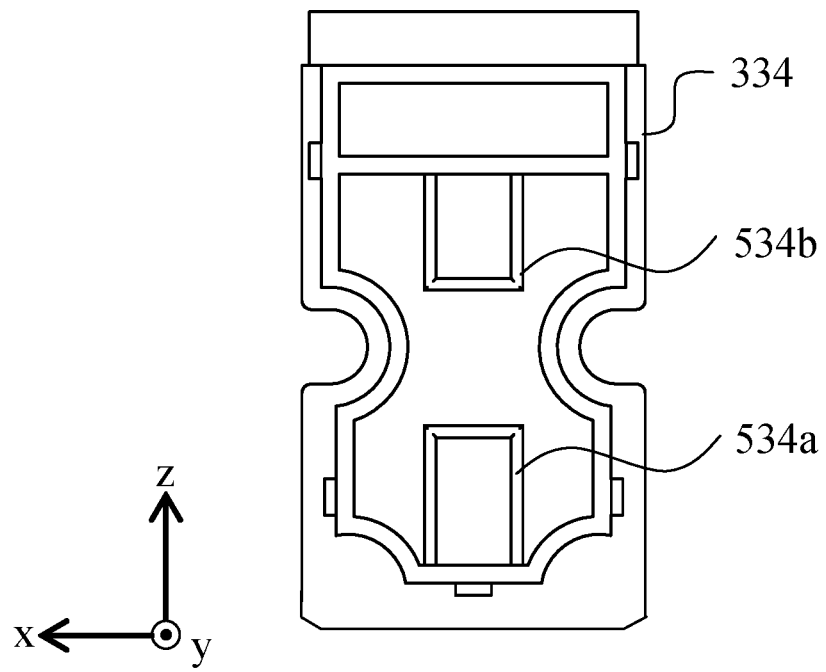
FIGS. 17A and 17B are diagrams each illustrating the shoe apparatus on an external medium apparatus according to the fourth embodiment.
Figure 17B:
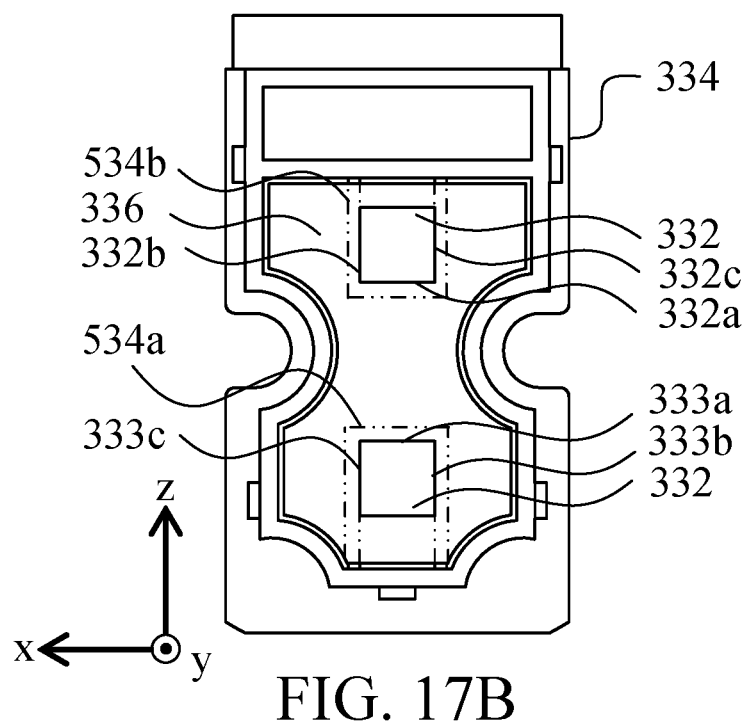

FIGS. 17A and 17B illustrate a shoe apparatus 330 in this embodiment. FIG. 17A illustrates a second cover member 334 as viewed from the upper side, that is, the +y side. FIG. 17B illustrates a second receiver 332, a second transmitter 333, a second anti-magnetic member 336 and a second cover member 334 as viewed from the upper side.

As illustrated in FIG. 17A, the second cover member 334 includes a second groove 534a and a fourth groove 534b. In a view from the upper side, as indicated by two-dot chain lines in FIG. 17B, the second groove 534a extends in the x direction at a position next to a first edge 333a on the second receiver 332 side of the second transmitter 333, and extends in the z direction at positions next to a second edge 333b and a third edge 333c, each of which is orthogonal to and next to the first edge 333a. The second cover member 334 includes the second groove 534a in an area overlapping the second anti-magnetic member 336. As a result, on the second cover member 334, the second groove 534a divides the area overlapping the second anti-magnetic member 336 into an area including the second transmitter 333 and the other area.

In a view from the upper side, as indicated by two-dot chain lines in FIG. 17B, the fourth groove 534b extends in the x direction at a position next to a first edge 332a on the second transmitter 333 side of the second receiver 332, and extends in the z direction at positions next to a second edge 332b and a third edge 332c, each of which is orthogonal to and next the first edge 332a. The second cover member 334 includes the fourth groove 534b in an area overlapping the second anti-magnetic member 336. As a result, on the second cover member 334 in the xz plane, the fourth groove 534b divides the area overlapping the second anti-magnetic member 336 into an area including the second receiver 332 and the other area. That is, on the second cover member 334, the second groove 534a and the fourth groove 534b divides the area overlapping the second anti-magnetic member 336 into the area including the second transmitter 333, the area including the second receiver 332, and the other area.

When the above-described second groove 534a and fourth groove 534b are provided, even if the radio waves emitted from the second transmitter 333 is reflected inside the second cover member 334 in the xz plane and the radio waves head toward the second receiver 332, since a distance to the second receiver 332 is increased, the radio waves can be attenuated and can be hindered from arriving at the second receiver 332.

In this embodiment, the second groove 534a and the fourth groove 534b are provided, but only the second groove 534a may be provided. Further, the portion of each of the second groove 534a and the fourth groove 534b extending in the z direction may be extended in a direction oblique to the z direction (a direction which is different from the x direction).

Fifth Embodiment

Next, a description will be given of a fifth embodiment of the present disclosure. In this embodiment, components common to the first to fourth embodiments are designated by the same reference numerals as those of those embodiments and a description thereof will be omitted.

Figure 18A:
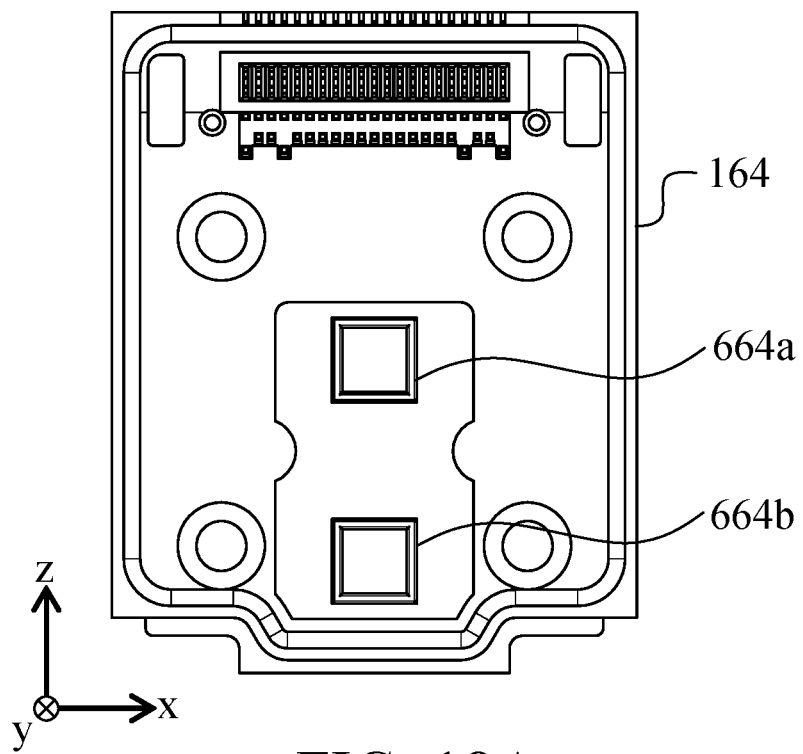
FIGS. 18A and 18B are diagrams each illustrating an accessory shoe apparatus according to a fifth embodiment.
Figure 18B:
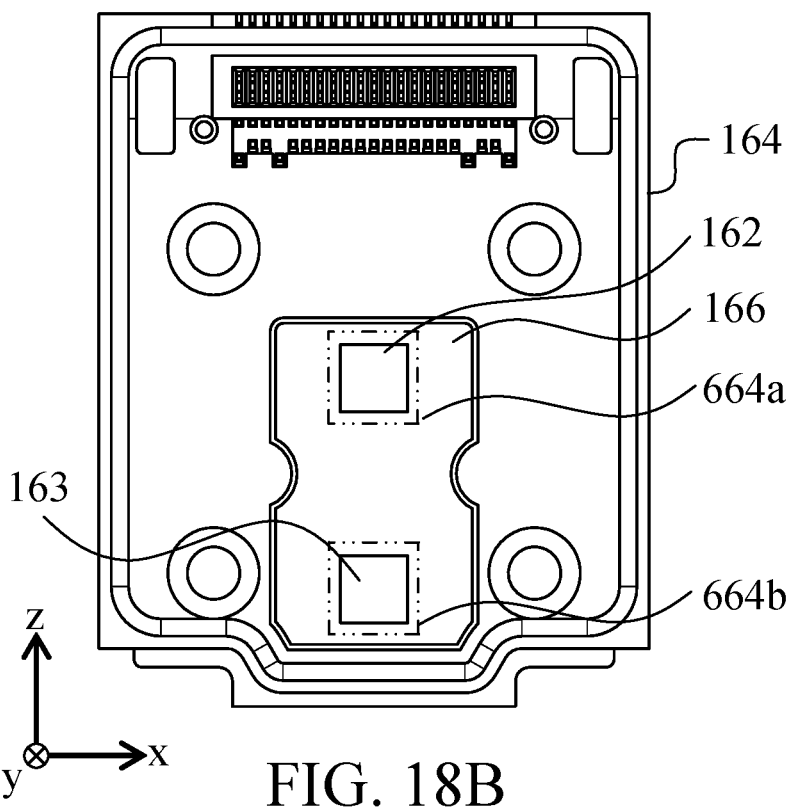

FIGS. 18A and 18B illustrate an accessory shoe apparatus 160 in this embodiment. FIG. 18A illustrates a first cover member 164 as viewed from the lower side, that is, the −y side. FIG. 18B illustrates a first transmitter 162, a first receiver 163, a first anti-magnetic member 166, and a first cover member 164 as viewed from the lower side.

As illustrated in FIG. 18A, the first cover member 164 includes a first groove 664a and a third groove 664b. In a view from the lower side, as indicated by two-dot chain lines in FIG. 18B, the first groove 664a is located at a position next to all four edges of the first transmitter 162, that is, a position along an entire perimeter of the first transmitter 162, and extends in the x direction and the z direction so as to surround the first transmitter 162. The first cover member 164 includes the first groove 664a in an area overlapping the first anti-magnetic member 166. As a result, on the first cover member 164, the first groove 664a divides the area overlapping the first anti-magnetic member 166 into an area including the first transmitter 162 and the other area.

In a view from the lower side, as indicated by two-dot chain lines in FIG. 18B, the third groove 664b is located at a position next to all four edges of the first receiver 163, and extends in the x direction and the z direction so as to surround the first receiver 163. The first cover member 164 includes the third groove 664b in an area overlapping the first anti-magnetic member 166. As a result, on the first cover member 164, the third groove 664b divides the area overlapping the first anti-magnetic member 166 into an area including the first receiver 163 and the other area. That is, on the first cover member 164, the first groove 664a and the third groove 664b divide the area overlapping the first anti-magnetic member 166 into the area including the first transmitter 162, the area including the first receiver 163, and the other area.

When the first groove 664a is provided so that the first transmitter 162 is surrounded in the view from the lower side as described above, it is possible to hinder the radio waves emitted from the first transmitter 162 from diffusing around the first transmitter 162 and from reaching the first receiver 163. Further, when the third groove 664b is provided so that the first receiver 163 is surrounded in the view from the lower side, it is possible to hinder the radio waves emitted from the first transmitter 162 from reaching the first receiver 163.

In this embodiment, the first groove 664a and the third groove 664b are provided, but only the first groove 664a may be provided. Further, the portion of each of the first groove 664a and the third groove 664b extending in the z direction may be extended in a direction oblique to the z direction (a direction which is different from the x direction).

Figure 19A:
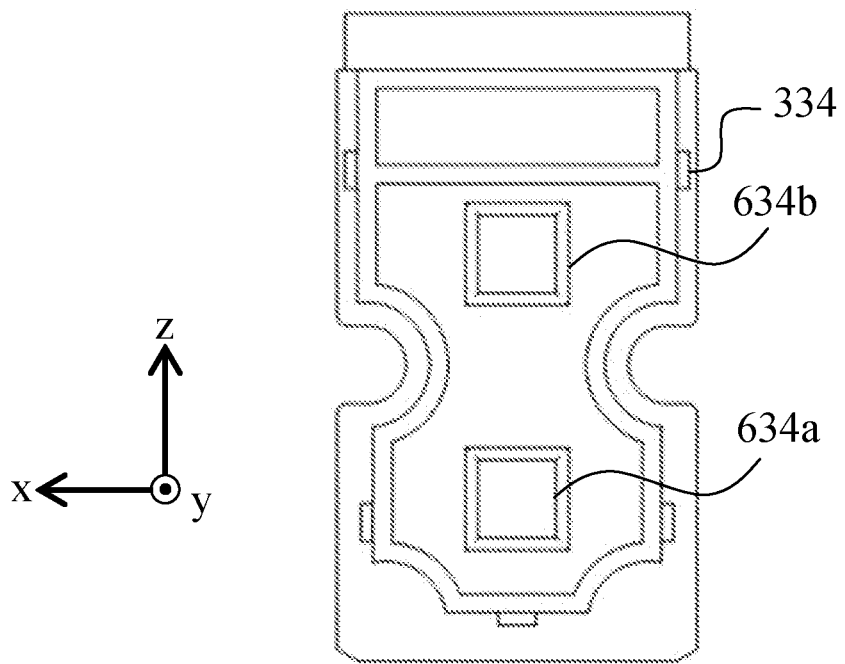
FIGS. 19A and 19B are diagrams each illustrating a shoe apparatus on an external medium apparatus according to the fifth embodiment.
Figure 19B:
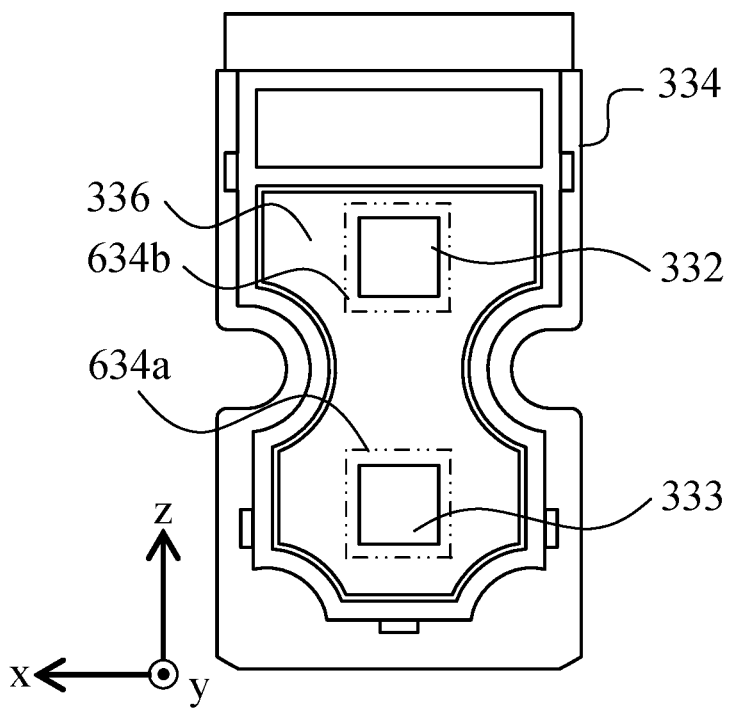

FIGS. 19A and 19B illustrate a shoe apparatus 330 in this embodiment. FIG. 19A illustrates a second cover member 334 as viewed from the upper side, that is, the +y side. FIG. 19B illustrates a second receiver 332, a second transmitter 333, a second anti-magnetic member 336 and a second cover member 334 as viewed from the upper side.

As illustrated in FIG. 19A, the second cover member 334 includes a second groove 634a and a fourth groove 634b. In a view from the upper side, as indicated by two-dot chain lines in FIG. 19B, the second groove 634a is located at a position next to four edges of the second transmitter 333, and extends in the x direction and the z direction so as to surround the second transmitter 333. The second cover member 334 includes the second groove 634a in an area overlapping the second anti-magnetic member 336. As a result, on the second cover member 334, the second groove 634a divides the area overlapping the second anti-magnetic member 336 into an area including the second transmitter 333 and the other area.

In a view from the upper side, as indicated by two-dot chain lines in FIG. 19B, the fourth groove 634b is located at a position next to four edges of the second receiver 332, and extends in the x direction and the z direction so as to surround the second receiver 332. The second cover member 334 includes the fourth groove 634b in an area overlapping the second anti-magnetic member 336. As a result, on the second cover member 334, the fourth groove 634b divides the area overlapping the second anti-magnetic member 336 into an area including the second receiver 332 and the other area. That is, on the second cover member 334, the second groove 634a and the fourth groove 634b divide the area overlapping the second anti-magnetic member 336 into the area including the second transmitter 333, the area including the second receiver 332, and the other area.

When the second groove 634a is provided so that the second transmitter 333 is surrounded in the view from the upper side as described above, it is possible to hinder the radio waves emitted from the second transmitter 333 from diffusing around the second transmitter 333 and from reaching the second receiver 332. Further, when the fourth groove 634b is provided so that the second receiver 332 is surrounded in the view from the upper side, it is possible to hinder the radio waves emitted from the second transmitter 333 from reaching the second receiver 332.

In this embodiment, the second groove 634a and the fourth groove 634b are provided, but only the second groove 634a may be provided. Further, the portion of each of the second groove 634a and the fourth groove 634b extending in the z direction may be extended in a direction oblique to the z direction (a direction which is different from the x direction).

The above embodiments can reduce limitations on communication between the electronic apparatus and the accessory apparatus.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-109357, filed on Jun. 25, 2020 which is hereby incorporated by reference herein in its entirety.

What is claimed is:

1. A shoe apparatus on an accessory apparatus where the shoe apparatus is detachably attachable to an accessory shoe apparatus on an electronic apparatus, the shoe apparatus comprising:
   a foot member including a pair of foot engagement portions configured to engage with a pair of engagement portions of the accessory shoe apparatus; and
   a communication element disposed between the pair of foot engagement portions of the foot member and configured to perform wireless communication with the accessory shoe apparatus,
   wherein the communication element performs the wireless communication through an area between the pair of foot engagement portions engaging with the pair of engagement portions.

2. The shoe apparatus according to claim 1, further comprising a cover member made of non-conductive material and configured to cover the communication element.

3. The shoe apparatus according to claim 1,
   wherein the foot member is configured to slide in a first direction with respect to the accessory shoe apparatus and engage with the accessory shoe apparatus,
   wherein the shoe apparatus includes a pair of lock members configured to engage with a pair of lock engagement portions on the accessory shoe apparatus so as to hinder the shoe apparatus from falling off the accessory shoe apparatus,
   wherein the pair of lock members is disposed on the foot member and at positions separate from each other in a second direction that intersects the first direction, and
   wherein the communication element is disposed between the pair of lock members in a view from a side facing the area through which the communication element performs the wireless communication.

4. The shoe apparatus according to claim 1, wherein the communication element performs the wireless communication through the area with a communication element disposed between the pair of engagement portions in the accessory shoe apparatus.

5. The shoe apparatus according to claim 1,
wherein the foot member is configured to slide in a first direction and engage with the accessory shoe apparatus,
wherein the shoe apparatus includes an electric terminal configured to come into contact with the accessory shoe apparatus engaged with the foot member, and
wherein the communication element is disposed in a direction opposite to the first direction from the electric terminal.

6. The shoe apparatus according to claim 5, wherein the communication element is disposed so that the communication element is not located on a side closer to the accessory shoe apparatus engaged with the foot member than a tip portion of the electric terminal coming into contact with the accessory shoe apparatus.

7. The shoe apparatus according to claim 6,
wherein the electric terminal includes an extension portion extending from the tip portion in the direction opposite to the first direction, and
wherein the communication element is disposed so that the communication element and at least part of the electric terminal are lined up in a direction facing the accessory shoe apparatus engaged with the foot member.

8. The shoe apparatus according to claim 7, wherein, in the extension portion, a position of an end on a side opposite to a tip portion side is different from a position of an end on the tip portion side, and is shifted to a side opposite to the side closer to the accessory shoe apparatus engaged with the foot member.

9. The shoe apparatus according to claim 8,
wherein at least part of the communication element is disposed on a space between the electric terminal and a surface of the shoe apparatus facing the accessory shoe apparatus engaged with the foot member, and
wherein the space is generated by a difference between the position of the end on the tip portion side and the position of the end on the side opposite to the tip portion side, in the extension portion.

10. The shoe apparatus according to claim 1, further comprising:
a transmission element and a reception element each being the communication element and which are arranged separately from each other;
an anti-magnetic member disposed at least between the transmission element and the reception element; and
a cover member made of non-conductive material and configured to cover the transmission element, the reception element, and the anti-magnetic member,
wherein, on the cover member, a groove is formed in an area covering the anti-magnetic member so that radio waves from the transmission element are hindered from propagating inside the cover member.

11. The shoe apparatus according to claim 10, wherein, in a plane covered by the cover member, (i) the transmission element and the reception element are separated from each other in a first direction, and (ii) at least part of the groove extends in a second direction that intersects the first direction at a position which is closer to the transmission element than the reception element in the first direction on the cover member.

12. An accessory apparatus comprising:
a foot member including a pair of foot engagement portions configured to engage with a pair of engagement portions of an accessory shoe apparatus on an electronic apparatus; and
a communication element disposed between the pair of foot engagement portions of the foot member and configured to perform wireless communication with the accessory shoe apparatus,
wherein the communication element performs the wireless communication through an area between the pair of foot engagement portions engaging with the pair of engagement portions.

13. The accessory apparatus according to claim 12, wherein the communication element performs the wireless communication through the area with a communication element disposed between the pair of engagement portions in the accessory shoe apparatus.

* * * * *